US007623282B2

(12) United States Patent
Oda

(10) Patent No.: US 7,623,282 B2
(45) Date of Patent: Nov. 24, 2009

(54) IMAGE FORMING APPARATUS

(75) Inventor: Ayumu Oda, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/411,023

(22) Filed: Mar. 25, 2009

(65) Prior Publication Data

US 2009/0251755 A1 Oct. 8, 2009

(30) Foreign Application Priority Data

Apr. 3, 2008 (JP) ............................ 2008-097129

(51) Int. Cl.
*G02B 26/08* (2006.01)
*B41J 27/00* (2006.01)

(52) U.S. Cl. ..................... 359/216.1; 347/232; 347/261

(58) Field of Classification Search ..................... None
See application file for complete search history.

(56) References Cited

U.S. PATENT DOCUMENTS

2009/0073407 A1* 3/2009 Okita .......................... 355/53

FOREIGN PATENT DOCUMENTS

JP 020010665 * 3/2001
JP 2002-248806 A 9/2002
JP 2007-178573 A 7/2007

* cited by examiner

*Primary Examiner*—James Phan
(74) *Attorney, Agent, or Firm*—Birch, Stewart, Kolasch & Birch LLP

(57) ABSTRACT

An image forming apparatus including: a polygon motor that rotates a reflection member; a laser emitting section that emits a laser beam toward a side face of the rotating reflection member; a photoconductor that is scanned by a laser beam reflected from the side face of the reflection member; a beam detecting section that detects a scanning start position of the reflected laser beam, and a scanning final position; and a control section that controls the polygon motor and the laser emitting section, based on detection signals from the beam detecting section, wherein when the detection signal at the scanning start position does not meet a predetermined time-based standard and/or a predetermined output-level standard, the control section controls the polygon motor so that the reflection member rotates in a reverse direction.

12 Claims, 15 Drawing Sheets

IMAGE FORMING APPARATUS

CROSS-REFERENCE TO RELATED APPLICATION

This application is related to Japanese Patent Application No. 2008-097129 filed on Apr. 3, 2008, whose priority is claimed and the disclosure of which is incorporated by reference in its entirety.

BACKGROUND OF THE INVENTION

1. Field of the Invention

The present invention relates to an image forming apparatus in which a photoconductor is exposed by a laser beam.

2. Description of the Related Art

There has been known, as an electrophotographic image forming apparatus, an apparatus in which a surface of a photoconductor is scanned and exposed by a laser beam. A general mechanism for scanning the laser beam includes a rotating reflection member (polygon mirror), wherein a laser beam emitted from a laser source, which is located at a fixed position, is reflected on the rotating reflection member so as to be deflected in a predetermined direction according to a change in a reflection angle caused by a rotation of the reflection member, whereby the photoconductor is scanned.

If a side face (reflection surface) of the polygon mirror is dirty due to a deposition of dusts, a reflectivity of the laser beam is reduced, which affects an image. In view of this, there has been proposed a laser exposure apparatus that detects an intensity of the laser beam, which has passed through an optical component, by means of a BD sensor (beam detecting sensor) in order to correct a laser output (see, for example, Japanese Unexamined Patent Publication No. 2002-248806).

However, it has been found that dirt on the reflection surface caused with its use does not uniformly advance all over the reflection surface. According to an experience of inventors, a leading end in a rotating direction becomes dirtier than other portions. This entails a problem that the BD sensor, which detects the laser beam reflected by the leading end of the reflection surface, cannot detect the laser beam.

FIGS. 14A to 14C are explanatory views illustrating a state of dirt on a reflection surface in a conventional image forming apparatus. FIG. 14A illustrates an initial state, in which the side face (reflection surface) of the polygon mirror 211R is not at all dirty. When the image forming apparatus is used from the state illustrated in FIG. 14A, the reflection surface is brought into a state shown in FIG. 14B, and then, into a state shown in FIG. 14C. As a period when the apparatus is used is increased (when a cumulative time of rotation of the polygon mirror 211 increases), the dirt 273 is deposited onto the reflection surface of the polygon mirror 211. As apparent from FIGS. 14B and 14C, the dirt near the leading end 212 in the rotating direction is heavier than the other portions of the reflection surface.

FIGS. 15A to 15C are an explanatory view illustrating a state in which a laser beam is deflected with a rotation of one of the reflection surfaces of the polygon mirror 211 to become a scanning beam in the conventional image forming apparatus. As illustrated in FIGS. 15A to 15C, the reflectivity of the laser beam that scans a scanning start end reduces when dirt is deposited onto a leading end 212 of the reflection surface.

The reason why the dirt 273 is selectively deposited onto the leading end 212 of the reflection surface 211R as shown in FIGS. 14A to 14C is assumed as described below. An airflow produced by the rotation of the polygon mirror causes the dirt deposited onto the reflection surface of the polygon mirror to fall. However, an excessive airflow A (see the figure below) is generated at the leading end of the reflection surface, so that the airflow becomes dead. Therefore, the dirt deposited at the leading end of the reflection surface is difficult to remove compared to the other portions.

Even if the laser output is corrected as described in Japanese Unexamined Patent Publication No. 2002-248806, the output is soon beyond a correctable range as the dirt becomes heavy. If so, the laser beam cannot be detected unless the reflection surface of the polygon mirror is cleaned.

SUMMARY OF THE INVENTION

The present invention is accomplished in view of the above-mentioned circumstance, and aims to provide a technique capable of delaying a period for cleaning, compared to a conventional case, even if a reflection surface of a polygon mirror becomes dirty as it is used.

The present invention provides an image forming apparatus including: a polygon motor that rotates a reflection member in the shape of an equilateral polygonal column about an axis of the reflection member; a laser emitting section that emits a laser beam toward a side face of the rotating reflection member; a photoconductor that is scanned by a laser beam reflected from the side face of the reflection member; a beam detecting section that detects the reflected laser beam at a scanning start position and a scanning final position respectively, the scanning start position being the position just before where the scanning of the photoconductor starts, and the scanning final position being the position just after where the scanning of the photoconductor ends; and a control section that controls the polygon motor and the laser emitting section, based on detection signals from the beam detecting section, wherein when the detection signal at the scanning start position does not meet a predetermined time-based standard and/or a predetermined output-level standard, the control section determines that the apparatus is in a state in which the detection signal is not normally outputted or in a state in which the detection signal is predicted not to be normally outputted, and the control section then controls the polygon motor so that the reflection member rotates in a reverse direction.

In an image forming apparatus according to the present invention, when a control section determines that the apparatus is in a state in which a detection signal at a scanning start end is not normally outputted, the control section controls a polygon motor in such a manner that a reflection member is rotated in a reverse direction. Therefore, even if dirt on the reflection surface (a side face) of the reflection member becomes heavy as it is used and the apparatus reaches a state in which the detection signal at the scanning start end is not normally outputted, a rotating direction of the reflection member is reversed in order to be capable of again detecting a detection signal at the scanning start end. Accordingly, even if the reflection surface of the polygon mirror becomes dirty as it is used, a cleaning cycle is delayed more than a conventional time. Preferably, the cleaning cycle can be prolonged about twice the cleaning cycle in the conventional case.

DETAILED DESCRIPTION OF THE PREFERRED EMBODIMENTS

Figure 1:
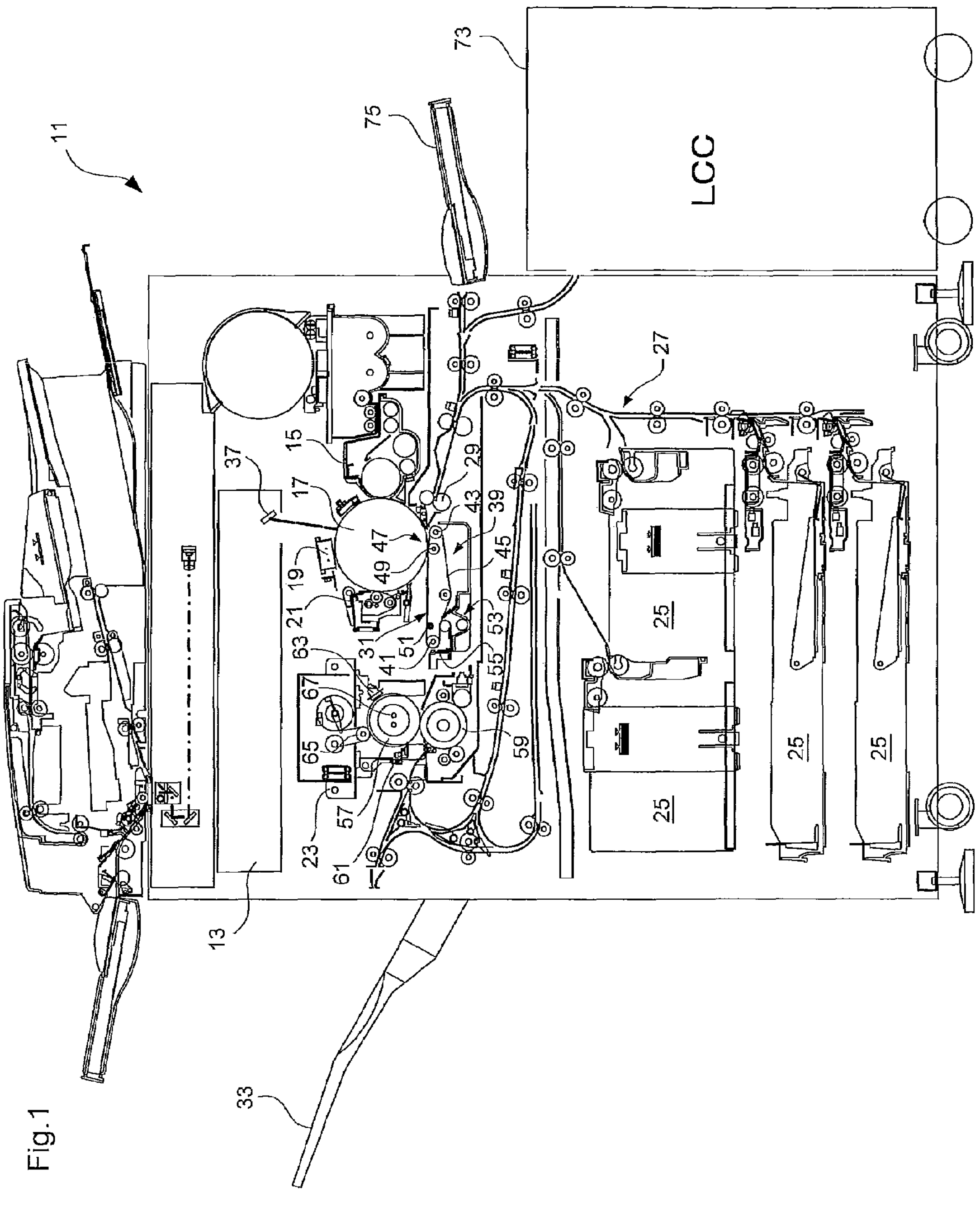
FIG. 1 is an explanatory view illustrating a schematic configuration of an image forming apparatus according to the present invention.

In the present invention, the reflection member has a shape of an equilateral polygonal column. A laser beam is reflected onto the side face of the reflection member during its rotation, wherein the laser beam is deflected. Specifically, the reflection member is called a polygon mirror. The reflection member has a shape of the equilateral polygonal column. However, the reflection member generally has a shape of ellipse in which a height is smaller than a width in a diameter direction. An aluminum material is generally used for the polygon mirror, since the aluminum material has a high reflectivity, and further, the side face of the polygon mirror made of the aluminum material can be processed with high precision. However, the invention is not limited thereto.

The polygon motor rotates the polygon mirror with revolution such as several thousands of revolutions to several tens of thousands of revolutions per minute according to a specification of the image forming apparatus. A brushless DC motor is generally used, since the revolution can be controlled with high precision. However, a type of the motor is not limited thereto. A laser diode device, which is compact and inexpensive, is used as a laser emitting section, but other laser beam source may be employed.

As a photoconductor, a photoconductor formed with an organic photoconductor (OPC) layer applied on a peripheral surface of an aluminum tube serving as a base is used. However, a type of the photoconductor is not limited thereto. Any material having photoconductivity may be employed.

The beam detecting section is arranged at a predetermined position on a scanning path of the laser beam for detecting the laser beam passing this position. An optical sensor is used for detecting the laser beam. Examples of an applicable optical sensor include a photodiode made of a silicon material, or a phototransistor. However, any optical sensors made of any materials may be employed.

The control section includes a CPU or a microcomputer (hereinafter referred to as CPU representatively), a ROM that stores a control program that should be executed by the CPU, a RAM that provides a work area for an operation, an input circuit to which input signals from sensors at respective sections of the image forming apparatus are inputted, an output circuit to which signals for controlling loads at respective sections in the image forming apparatus are outputted, and a laser control circuit that controls an emission of the laser emitting section. The detection signal from the beam detecting section is inputted to the input circuit. The output circuit outputs the control signal to the polygon motor and the control signal for controlling the emission of the laser emitting section.

The laser beam reflected on one side face of the polygon mirror firstly exposes the beam detecting section at the scanning start end. Thereafter, the scanning position moves with the rotation of the side face, so that the laser beam exposes the photoconductor in one direction. Then, the laser beam exposes the beam detecting section at a scanning terminal end. When the polygon mirror further rotates, the laser beam is reflected on a next side face, whereby the beam detecting section is again exposed at the scanning start end.

The preferable embodiments of the present invention will be described below.

The control section may control the laser emitting section at a time when the detection signal at the scanning start position is determined as a standard, so that a scanning pattern on the photoconductor is controlled. By virtue of this configuration, the emission of the laser emitting section can precisely be controlled in each scan with the predetermined position of the photoconductor before the start of the scan being defined as a reference. Therefore, the photoconductor can be exposed with high precision.

The control section may predict when a next detection signal at the scanning start position will be outputted, based on the previous detection signals at the scanning start position, and when mis-detections occur a predetermined number of times, in which the detection signal is not detected although the detection signal is predicted to be outputted, the control section may further determine that the apparatus is in the state in which the detection signal is not normally outputted. By virtue of this configuration, when the state in which the detection signal is not detected unexpectedly (mis-detection) occurs, this situation is excluded. Therefore, more stable determination can be made.

In the present invention, when an output level of the detection signal at the scanning start position is outside a predetermined range, the control section may further determine that the apparatus is in the state in which the detection signal is not normally outputted or in the state in which the detection signal is predicted not to be normally outputted. By virtue of this configuration, the control section can recognize that the apparatus is in the state in which the detection signal is not normally detected. The predetermined range is appropriately set, whereby the state in which the detection signal is not normally detected can be recognized before this state occurs. Accordingly, there is no chance that an image is formed with the detection signal not detected, with a result that there arises no situation in which a user has a sense of distrust about the formed image.

The image forming apparatus of the present invention may further include: a rotation time measurement section that measures rotation time of the polygon motor; and a cumulative rotation time storage section that stores a cumulative value of the measured rotation time, wherein the control section may enable the rotation time measurement section to measure the rotation time from when the polygon motor starts rotating to when the polygon motor stops, and may enable the cumulative rotation time storage section to store the cumulative value of the measured rotation time, and when the cumulative value reaches to a predetermined value, the control section may further determine that the apparatus is in the state in which the detection signal at the scanning start position is not normally outputted or in the state in which the detection signal is predicted not to be normally outputted. By virtue of this configuration, it can be determined whether or not the apparatus is in the state in which the detection signal is not normally detected. The predetermined value is appropriately set, whereby the state in which the detection signal is not normally detected can be recognized before this state occurs. Accordingly, there is no chance that an image is formed with the detection signal not detected, with a result that there arises no situation in which a user has a sense of distrust about the formed image.

The beam detecting section may include: a single optical sensor; and optical members that are positioned at the scanning start position and the scanning final position respectively, and may guide the reflected laser beam to the optical sensor when the reflected laser beam scans each position. By virtue of this configuration, the detection signal at the scanning start end and the detection signal at the scanning terminal end can be detected by a single photosensor.

The control section may measure time intervals between successive detection signals outputted from the optical sensor while the laser beam is continuously emitted from the laser emitting section; may identify the detection signal at the scanning start position or the detection signal at the scanning final position, based on time lengths of the intervals; and may predict when a next detection signal at the scanning start position will be outputted, based on a result of identifying the previous detection signals. By virtue of this configuration, the detection signal at the scanning start end can be identified by a simple process of determining the time interval between series of detection signals, whereby the detection signal afterward can be detected based on a result of identification.

The beam detecting section may include optical sensors that are positioned at the scanning start position and the scanning final position respectively. By virtue of this configuration, either one of two optical sensors can detect the detection signal at the scanning start end, even if the polygon motor rotates in the normal direction or the reverse direction, whereby a reference for controlling the emission of the laser emitting section can be acquired.

The above mentioned image forming apparatus may further include: a reporting section that reports to a user about information indicating that the reflection member has been rotated in the reverse direction. When the reflection member is rotated in the reverse direction, and the state in which the detection signal at the scanning start end in this direction is not normally outputted occurs, the detection signal at the scanning start end cannot be obtained even if the reflection member is rotated in an original direction. Therefore, it is preferable that a maintenance check or exchange of components is done in good time after the reflection member is rotated in the reverse direction. According to this embodiment, since a situation in which changeover is made for rotating the reflection member in the reverse direction is reported to a user, an appropriate measure can be taken at an early point.

The cumulative rotation time storage section may further store a time period from when the control section controls the rotation of the reflection member in a predetermined direction to when the control section controls the rotation of the reflection member in the reverse direction, and the reporting section may further report to a user about information promoting a maintenance check and/or component replacement while the reflection member rotates in the reverse direction but before a time period of the reverse rotation reaches to the time period of the rotation in the predetermined direction. An advance of the dirt on the side face of the reflection member is greatly affected by an ambient environment where the image forming apparatus is installed. According to this embodiment, the cumulative rotation time storage section stores a period according to the environment where the image forming apparatus is installed, and this period is reflected on the time when information for promoting the user to do the next maintenance check and/or an exchange of components is reported, whereby an appropriate measure can be taken.

The control section may control emission illuminance of the laser beam from the laser emitting section when the control section controls the reverse rotation of the reflection member, so that intensity of the reflected laser beam at the scanning final position will be higher than intensity of the reflected laser beam at the scanning start position. By virtue of this configuration, the intensity of the laser beam can be corrected according to a degree of dirt on the side face of the reflection member corresponding to the scanning start end and at the scanning terminal end. Even if the dirt on the side face at the scanning start end and the dirt of the side face at the scanning terminal end are not equal to each other, the correction can allow the photoconductor to be more uniformly exposed with respect to the dirt.

The above mentioned image forming apparatus may further include: a storage section that stores image data indicating a set of pixels, wherein each of the pixels may comprise one or more color components; the photoconductor may be one or more in accordance with the number of the color components; the laser emitting section may be one or more in accordance with the number of the photoconductors; the control section may read from the storage section the pixels comprising the color components, and may control, according to the read pixels, emission illuminance of a laser beam emitted from each of the laser emitting sections; each of the laser emitting sections may emit the laser beam toward the reflection member; each of the photoconductors may be scanned by a reflected laser beam emitted originally from the corresponding laser emitting section; the beam detecting section may detect any one of the reflected laser beams at the scanning start position and the scanning final position each; and the control section may control a changeover of an order, in which the pixels comprising the color components are read, from a normal order to a reverse order in accordance with the reverse rotation of the reflection member. By virtue of this configuration, the reading order of each pixel of each color component can be changed from the normal order to the reverse order, so that the control for rotating the polygon motor in the reverse direction can be done, in a configuration in which a plurality of laser beams are reflected on the side face of the reflection member for scan, i.e., a so-called a multibeam-one-polygon configuration.

The various preferable embodiments can be combined.

The present invention will be described in detail below with reference to the drawings. It should be understood that the following description is illustrative of the invention in all aspects, but not limitative of the invention.

<Configuration of Laser Scanning Optical System>

Figure 2:
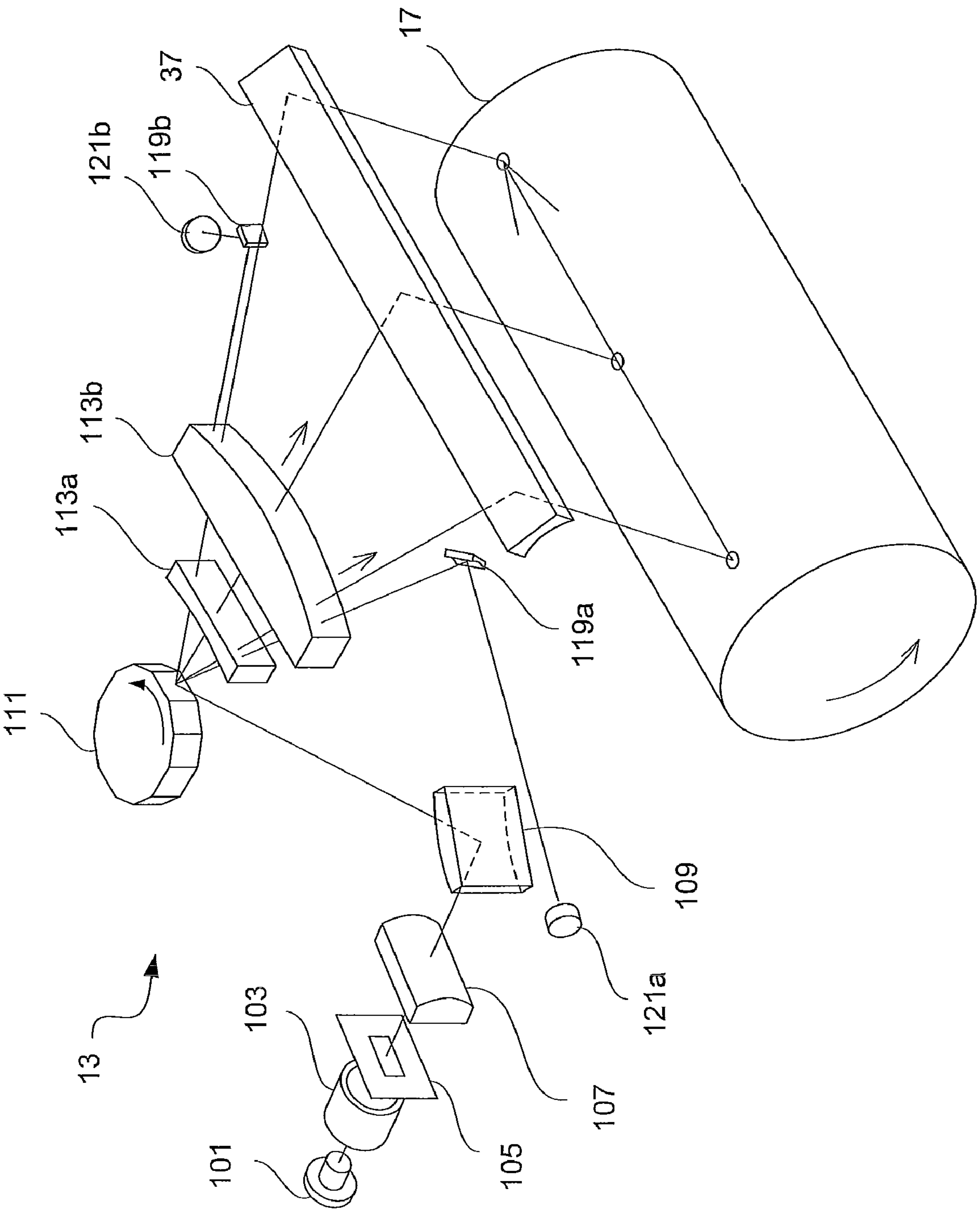
FIG. 2 is an explanatory view illustrating a configuration of a laser scanning optical system according to the present invention.

A configuration of a laser scanning optical system according to an image forming apparatus of the present invention will be described first. FIG. 2 is an explanatory view illustrating the configuration of the laser scanning optical system according to the present invention. In the present embodiment, the laser scanning optical system is made into a unit serving as an exposure unit. The exposure unit 13 includes a polygon mirror 111 serving as a reflection member, a polygon motor, not shown, for rotating the polygon mirror 111, a laser diode 101 serving as a laser emitting section, and a BD sensor serving as a beam detecting section. Additionally, the exposure unit 13 also includes a collimator lens 103, an opening plate 105, a cylindrical lens 107, a bending mirror 109, fθ lenses 113*a* and 113*b*, and a cylindrical mirror 37.

A laser beam emitted from the laser diode 101 passes through the collimator lens 103, whereby a sectional shape of the beam is shaped. Thus, the laser beam becomes a parallel beam. Thereafter, the laser beam passes through the opening plate 105, cylindrical lens 107, and bending mirror 109, and is reflected onto a side face of the polygon mirror 111. The side face of the polygon mirror 111 is subject to a mirror finish. The laser beam reflected on the side face of the polygon mirror 111 is deflected by a change in a reflection angle caused by a rotation of the polygon mirror 111, and becomes a scanning beam. Thereafter, the beam reaches a peripheral surface of a photoconductor drum 17 through the fθ lenses and the cylindrical mirror 37. The cylindrical photoconductor drum 17 is rotatably driven by an unillustrated drum motor. A photoconductive layer is formed on the peripheral surface of the photoconductor drum 17. The scanning beam scans the peripheral surface in a direction (main-scanning direction) parallel to a rotational axis of the photoconductor drum 17.

A BD bending mirror F 119*a*, a BD bending mirror R 119, a BD sensor F 121*a*, and a BD sensor R 121*b* are arranged at a scanning end in order to synchronize a timing of a scan by the laser beam with a signal (image signal) that controls an emission of the laser beam from the laser diode 101. The scanning beam reflected on the BD bending mirror F 121*a* is guided to the BD sensor F 121*a*. The scanning beam reflected on the BD bending mirror R 121*b* is guided to the BD sensor R 121*b*. When the scanning beam is detected, the BD sensor F 121*a* and the BD sensor R 121*b* respectively output a detection signal. The detection signal is inputted to an input circuit of an unillustrated control section. The laser control circuit 131 at the control section controls the emission of the laser beam from the laser diode 101 based on the inputted detection signal. Specifically, the laser control circuit 131 turns on or off the emission of the laser beam from the laser diode 101, and further controls to change an intensity of the emitted laser beam. This control is performed based on the image signal according to a pattern of an image that should be formed on the photoconductor drum.

<Configuration of Laser Control Circuit>

Figure 3:
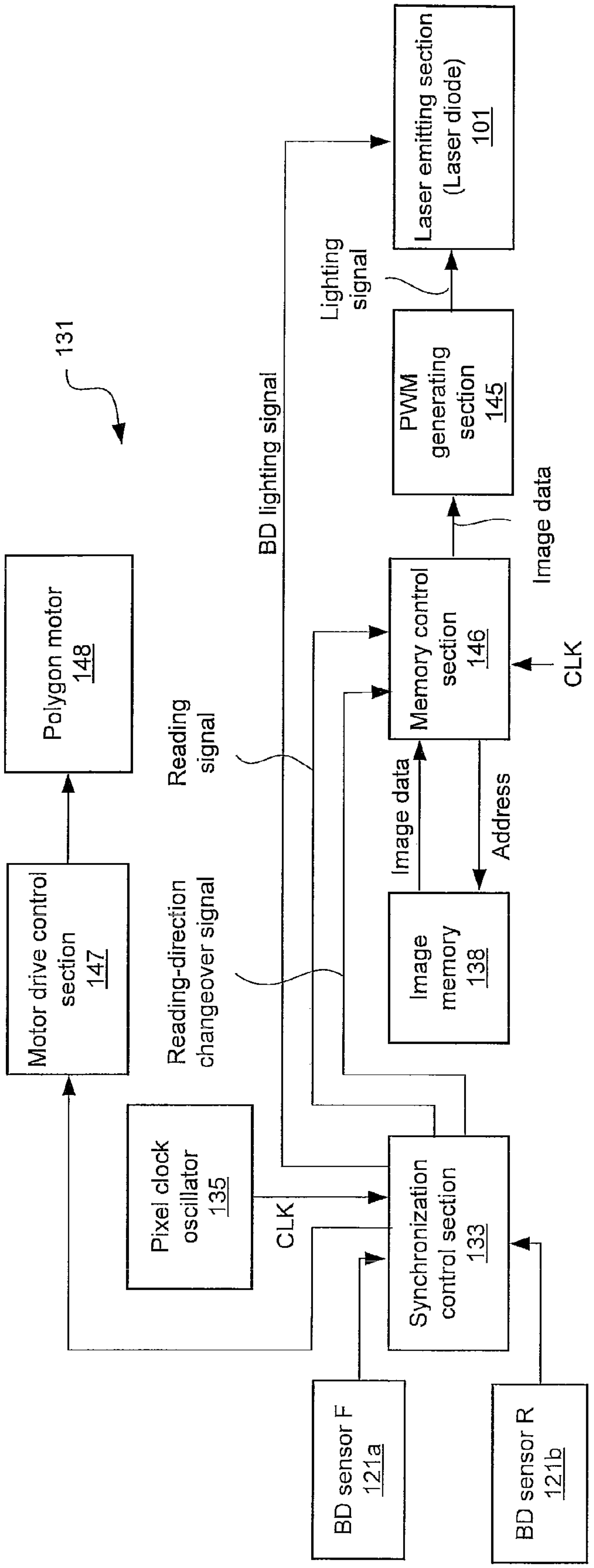
FIG. 3 is a block diagram illustrating a functional configuration of a control section, mainly a laser control circuit, in the image forming apparatus according to the present invention.

A detailed configuration of the laser control circuit 131 will be described. The laser control circuit 131 synchronizes a scanning position of the laser beam with control of an emission amount of the laser beam from the laser diode 101. FIG. 3 is a block diagram illustrating a functional configuration of the laser control circuit 131 in the control section of the image forming apparatus according to the present invention. As shown in FIG. 3, the laser control circuit 131 includes a pixel clock oscillator 135, a synchronization control section 133, a motor drive control section 147, a memory control section 146, and a PWM generating section 145. The pixel clock oscillator 135 generates a clock signal that becomes a reference of a scanning timing.

The synchronization control section 133 generates a BD lighting signal, a reading signal and a reading-direction changeover signal based on a pixel clock generated at the pixel clock oscillator 135 and an output from the BD sensor F 121*a*. The motor drive control section 147 generates a drive signal that drives a polygon motor 148.

The memory control section 146 is controlled by the reading signal and the reading-direction changeover signal from the synchronization control section 133. When the reading signal is ON, the memory control section 146 reads image data stored in an image memory 138. The image memory 138 stores image data that is written by laser. The reading-direction changeover signal is for changing the reading order of the image data from the image memory 138 between a normal order and a reverse order. In the normal order, the memory control section 146 changes addresses of the image data, which should be read, in the normal order, and receives the image data stored in the addresses from the image memory 138 one by one. In the reverse order, the memory control section 146 changes the addresses of the image data, which should be read, in the reverse order, and receives the image data stored in the addresses from the image memory 138 one by one.

The PWM generating section 145 generates a PWM signal, corresponding to each pixel, based on image data (in the present embodiment, one pixel is expressed by 8 bits). The PWM generating section 145 outputs a lighting signal, corresponding to the generated PWM signal, for PWM-modulating the intensity of the laser beam from the laser emitting section.

<Operation of Laser Control Circuit>

Figure 4:
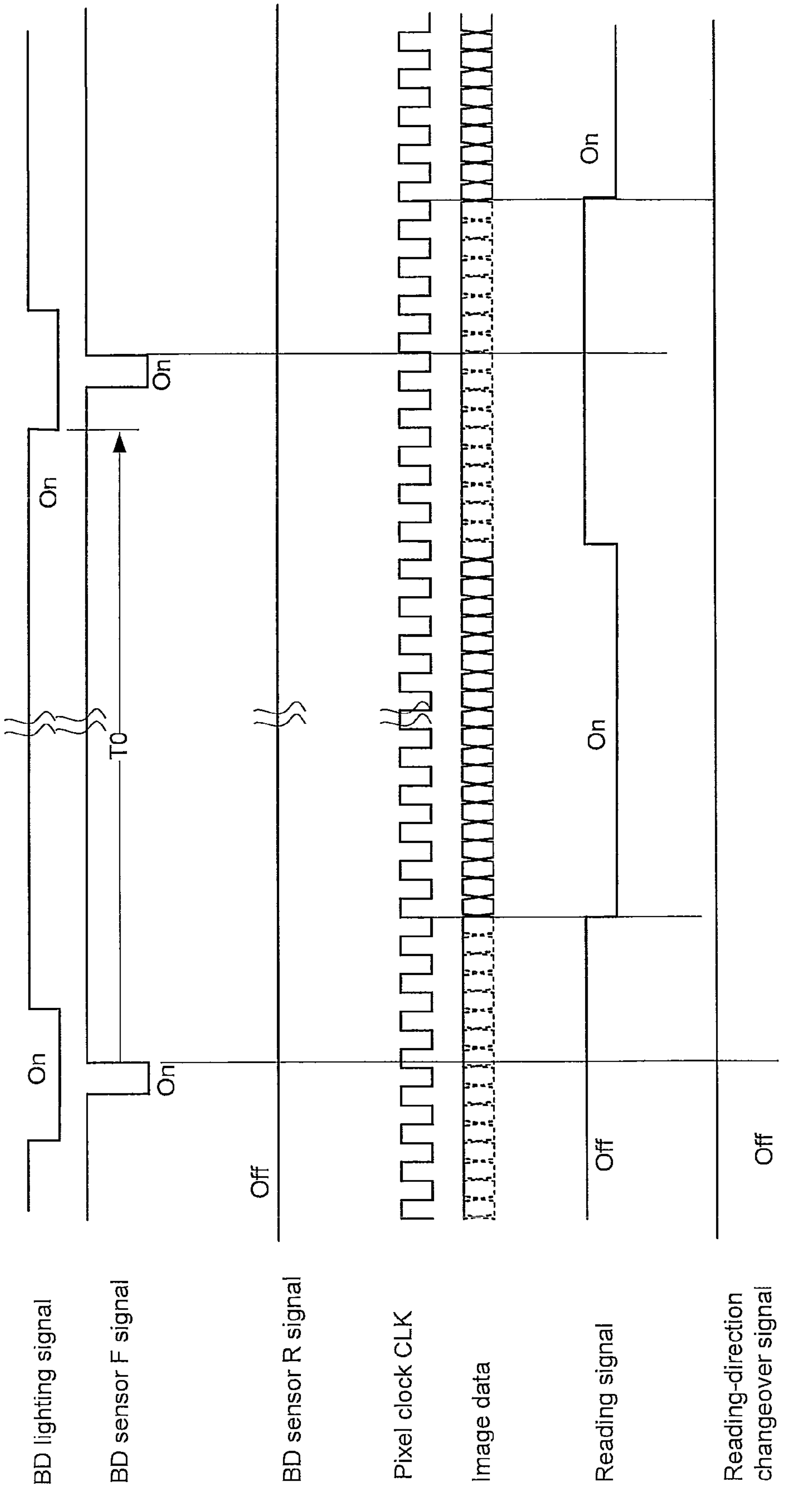
FIG. 4 is a waveform chart illustrating a signal waveform of the present invention when the laser control circuit shown in FIG. 3 is normally operated.

Next, an operation of the laser control circuit 131 will be described. FIG. 4 is a waveform chart illustrating a signal waveform during the normal operation of the laser control circuit 131 shown in FIG. 3.

The BD lighting signal is a signal for lighting the laser diode 101 in order to detect the laser beam by the BD sensor F 121*a* and the BD sensor R 121*b*. The BD lighting signal is generated based on the detection signals from the BD sensor F 121*a* and the BD sensor R 121*b* and the pixel clock. The laser control circuit 131 turns off the BD lighting signal after a predetermined pixel clock from a time, which is a reference, when the BD sensor F 121*a* is changed from an ON state to an OFF state. The laser diode 101 is temporarily turned off. During a period when the BD lighting signal is OFF, the laser control circuit 131 turns on the BD lighting signal after a predetermined pixel clock from when the BD lighting signal is turned OFF. The laser diode 101 is turned on, and the next detection of the BD signal is executed.

The BD sensor F signal and the BD sensor R signal, which have a pulse form, are beam detection signals by the BD sensor F 121*a* and the BD sensor R 121*b*, respectively.

The pixel clock is a signal having a fixed cycle generated by the pixel clock oscillator 135.

The reading signal is turned ON after a predetermined number of pixel clock (A) from when the BD sensor F signal is turned ON. The laser control circuit 131 keeps the ON-state of the reading signal during pixel clocks (e.g., 7000 pixels) corresponding to one main-scanning line, and then, is changed to the OFF state. During a time when the reading signal is ON, the laser emitting section is PWM-modulated based on the image signal for one line. The number of the delay pixel clock A described above corresponds to a value of an unillustrated predetermined register. Since a CPU in the control section rewrites the value of the register (value of A), an image position at the scanning start end in the main-scanning direction is adjusted.

The reading-direction changeover signal is for instructing the reading order from the image memory 138. In the embodiment shown in FIG. 4, the BD sensor F signal is normally outputted. Accordingly, the reading-direction changeover signal keeps the OFF state that corresponds to the normal-order reading. The reading-direction changeover signal is changed by the CPU so as to correspond to a rotating direction of the polygon motor 148.

When the dirt of the polygon mirror 111 becomes heavy during when the operation shown in FIG. 4 is continued, the BD sensor F signal corresponding to the leading end of the reflection surface is finally not outputted. Then, an interval of the BD sensor F signal increases more than a cycle of one line. The CPU in the control section recognizes this condition, and changes the rotating direction of the polygon mirror 148, and in addition, changes the reading-direction changeover signal to the reverse order.

Figure 5:
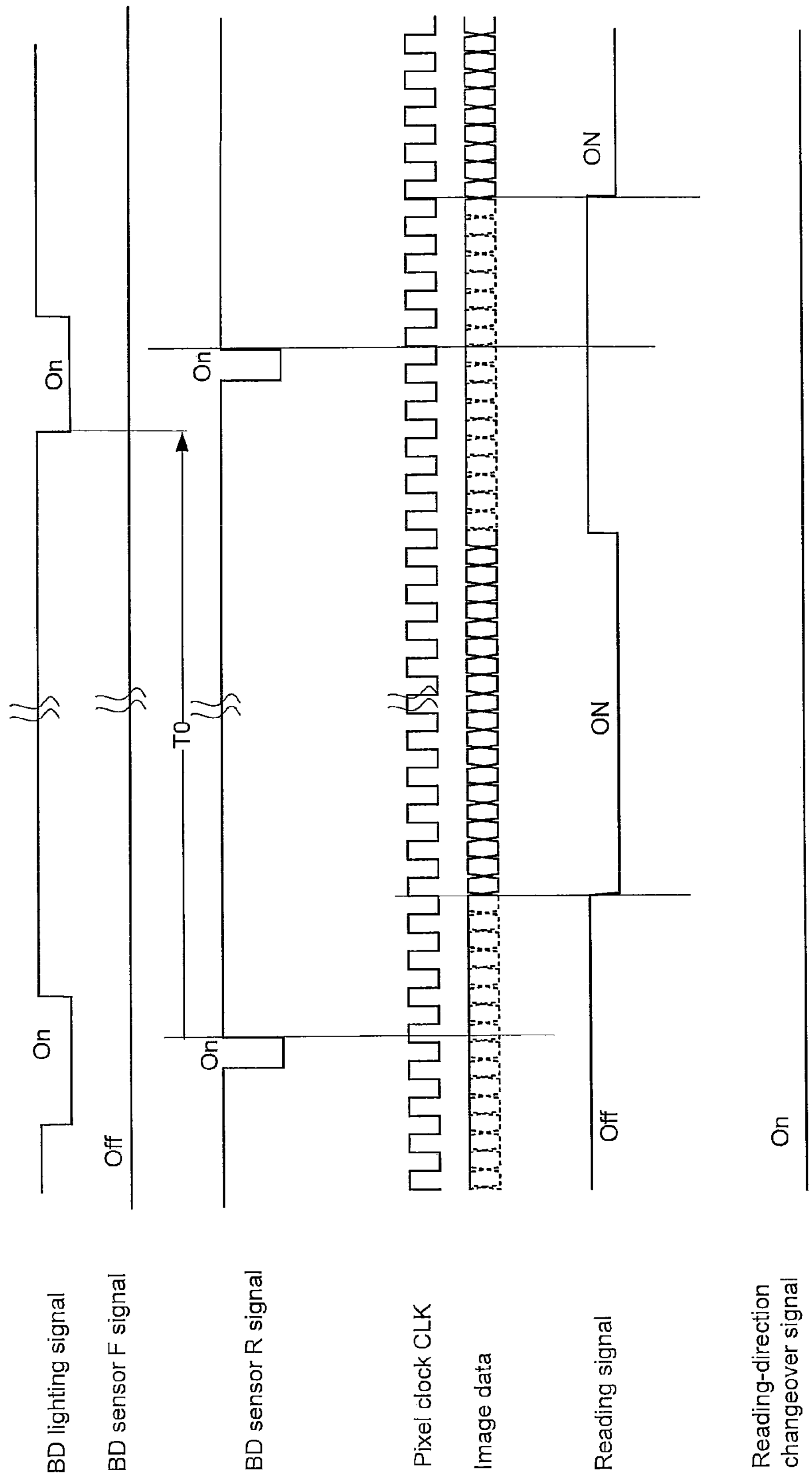
FIG. 5 is a waveform chart illustrating each signal waveform of the laser control circuit of the present invention after a CPU in the laser control circuit shown in FIG. 3 changes a rotating direction of a polygon motor.

FIG. 5 is a waveform chart illustrating each signal waveform of direction of the polygon motor 148. Each signal in FIG. 5 corresponds to the signal in FIG. 4.

Comparing FIG. 4 and FIG. 5, states of the reading-direction changeover signal is different. In FIG. 5, the signal keeps the ON state corresponding to the reverse-order reading.

Since the polygon motor 148 rotates in a reverse direction, the detection signal at the leading end of the reflection surface is detected by the BD sensor R 121*b*. The BD lighting signal is turned ON or OFF based on the BD sensor R signal. Since the laser control circuit 131 operates as described above, the image can normally be written even if the polygon motor 148 is rotated in the reverse direction.

<Modification of Laser Scanning Optical System>

Figure 6:
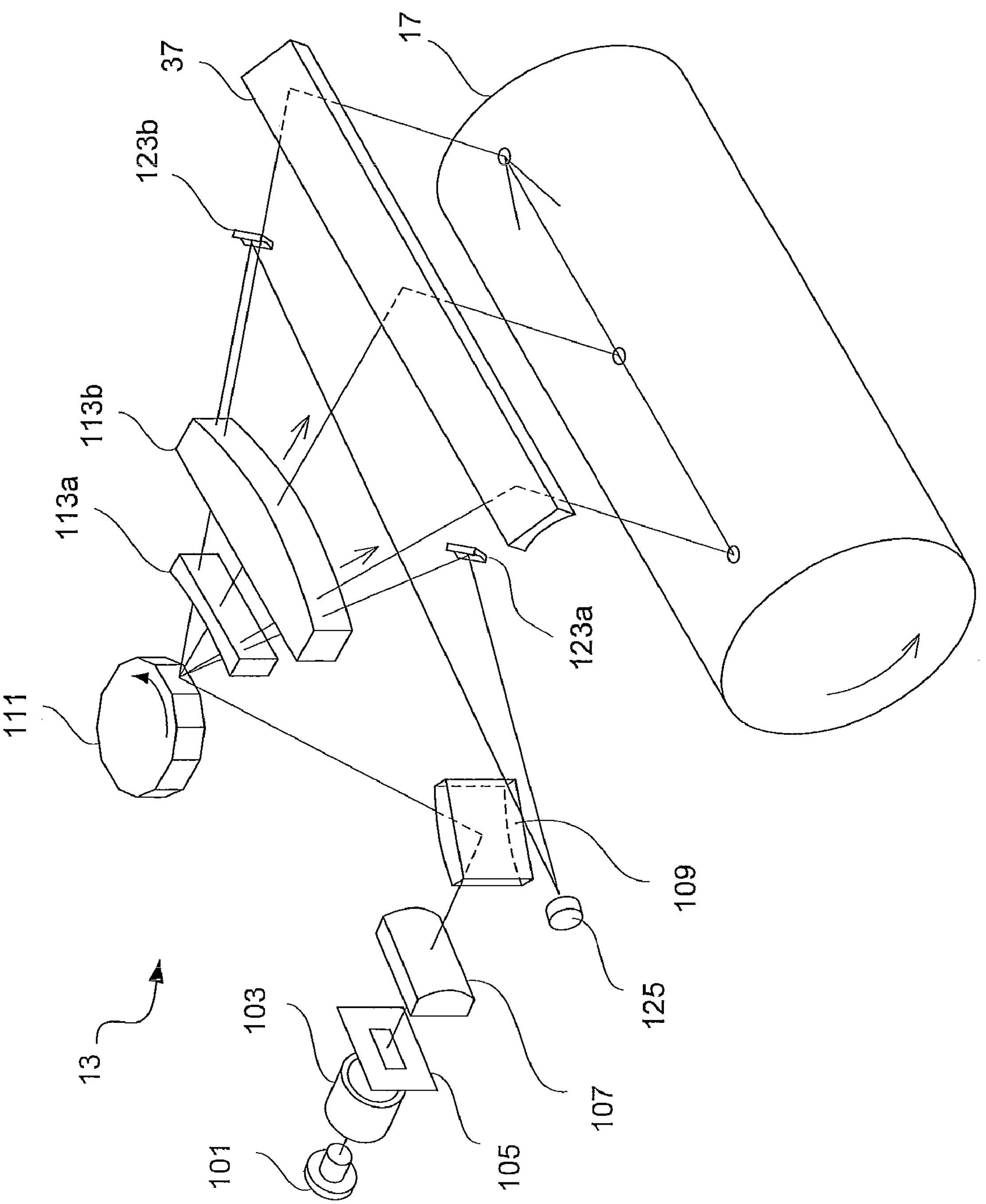
FIG. 6 is an explanatory view illustrating a modification of a laser scanning optical system according to the present invention.

A modification of the laser scanning optical system will be described. The laser scanning optical system shown in FIG. 2 has two BD sensors, i.e., the BD sensor F 121*a* and the BD sensor R 121*b*. In the modification, the two sensors are united. FIG. 6 is an explanatory view illustrating the modification of the laser scanning optical system according to the present invention.

The modification is different from the embodiment shown in FIG. 2 in that the modification has one BD sensor 125 instead of the BD sensor F 121*a* and the BD sensor R 121*b* in FIG. 2, and has a light-guiding mirror F 123*a* and a light-guiding mirror R 123*b* instead of the BD bending mirror F 119*a* and the BD bending mirror R 119*b* in FIG. 2. The light-guiding mirror F 123*a* and the light-guiding mirror R 123*b* guide the laser beam at the scanning start end and at the scanning terminal end to the common BD sensor 125. Compared to the configuration in FIG. 2, the number of the BD sensor can be reduced by one, whereby the configuration of the laser scanning optical system can be simplified.

Figure 7:
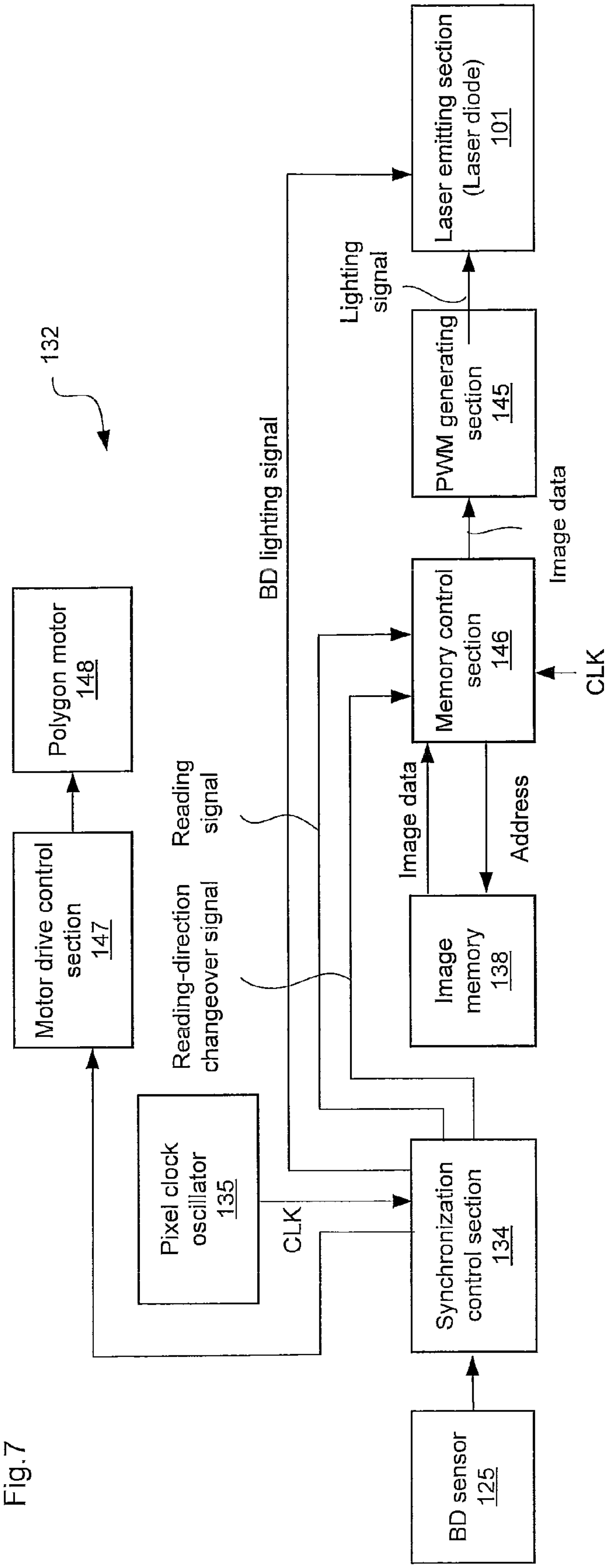
FIG. 7 is a block diagram illustrating a configuration of a control section of the present invention, particularly the laser control circuit, applied to the laser scanning optical system shown in FIG. 6.

FIG. 7 is a block diagram showing a configuration of the control section, particularly the laser control circuit 132, applied to the laser scanning optical system shown in FIG. 6. The block diagram in FIG. 7 is different from the block diagram in FIG. 3 in that there is only one BD sensor connected to a synchronization control section 134 in the block diagram in FIG. 7. The other configuration is the same as that in FIG. 3. By virtue of this configuration, a waveform obtained by synthesizing the BD sensor F signal and the BD sensor R signal in FIG. 3 is outputted as the BD sensor signal. Different from FIG. 3, the detection signal at the scanning start end and the detection signal at the scanning terminal end are alternately outputted from one BD sensor 125. Therefore, it is necessary to identify which signal pulse corresponds to the detection signal at the scanning start end and which signal pulse corresponds to the detection signal at the scanning terminal end. A procedure for the identification will be described below.

Figure 8A:
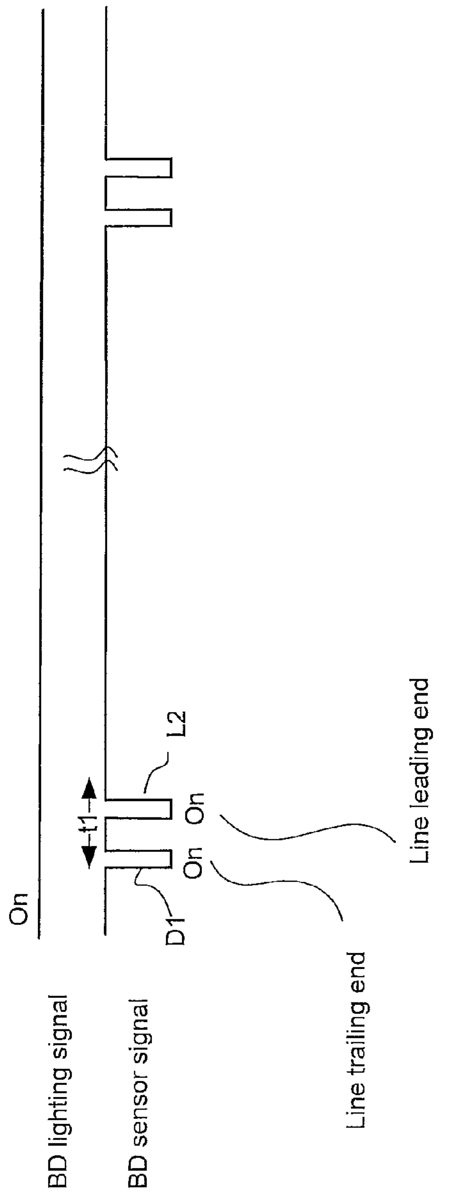
FIGS. 8A and 8B are waveform charts illustrating waveforms of a BD lighting signal and a BD sensor signal when identification is made in the laser control circuit of the present invention.
Figure 8B:
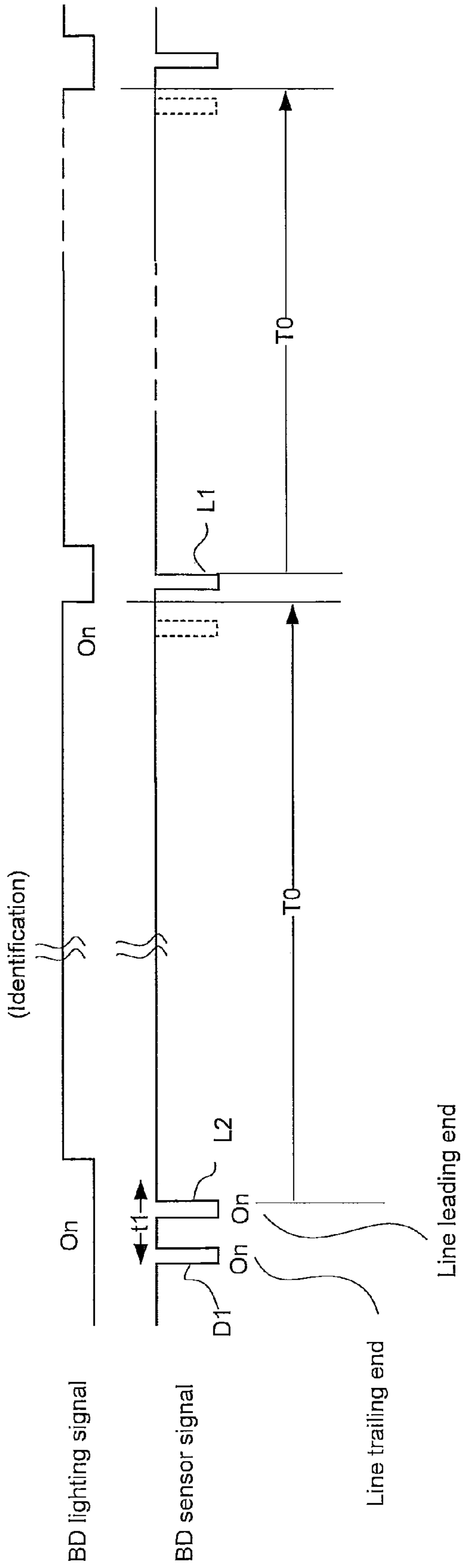

FIGS. 8A and 8B are waveform charts illustrating the waveform of the BD lighting signal and the BD sensor signal when the laser control circuit 132 performs the identification. After the power is turned on, the CPU makes the BD lighting signal turned ON at all times. Then, the output signal from the BD sensor 125 is turned ON twice for the scanning start end and the scanning terminal end for one main-scanning line. These signals are periodically outputted (FIG. 8A). A time interval of the signal pulses from the scanning start end to the scanning terminal end is determined by a process speed and a resolution of the image forming apparatus. This time interval is defined as t0. On the other hand, a period from when the detection signal at the scanning terminal end is outputted to when the detection signal at the next scanning start end is outputted is set to be not more than a threshold value t1 that is smaller than t0. The interval between the signal pulses is counted, and the signal pulse whose interval between the prior signal pulse and the signal pulse is not more than the threshold value t1 is defined as the detection signal at the scanning start end.

After the detection signal at the scanning start end is determined as described above, a falling edge (time D1) of a first signal pulse next to the detection signal is caught, and time L2 of a rising edge of the signal pulse (second signal pulse) next to the signal pulse is defined as a timing reference of the BD lighting signal. The BD lighting signal is temporarily turned OFF after a predetermined number of pixel clocks from the time L2. Further, after time T0, which corresponds to the predetermined pixel clocks obtained by adding a margin to pixels (7000 pixels) of one line, has elapsed from the time L2, the BD lighting signal is turned ON. When the BD lighting signal is detected afterward, the BD lighting signal is temporarily turned OFF after the predetermined number of pixel clocks from the rising edge of the BD lighting signal. Thus, the detection signal at the scanning terminal end can be masked, whereby only the detection signal at the scanning start end can be obtained (FIG. 8B).

After the identifying process described above is completed, only the signal at the scanning start end is obtained as the BD sensor signal. When the next BD signal is received, time L1 of a first rising edge is defined as a reference of the timing. The BD lighting signal is temporarily turned OFF after the predetermined number of pixel clocks from the time L1. Then, the BD lighting signal is turned ON after the time T0 has elapsed from the time L1. This control is repeated, whereby only the detection signal at the scanning start end can be obtained.

When the apparatus is in a state in which the BD signal is not normally outputted since the leading end of the reflection surface becomes dirty, the BD sensor signal is not outputted, so that the interval between the BD sensor signals is increased more than the cycle of one line. The CPU in the control section recognizes this state, and changes the rotating direction of the polygon motor 148 and also changes the reading-direction changeover signal to the reverse order.

Figures 9A, 9B, 9C:
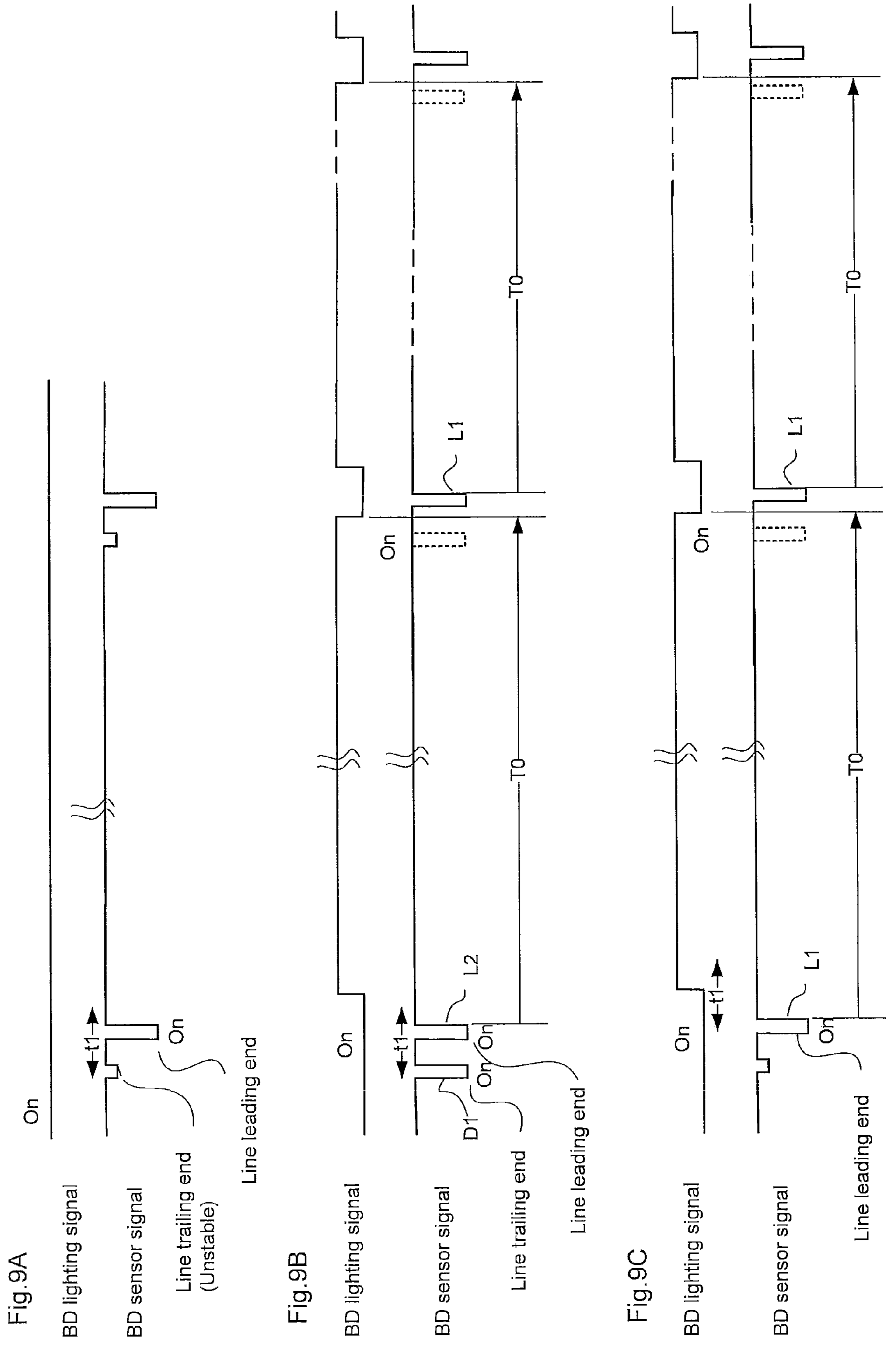
FIGS. 9A to 9C are waveform charts illustrating signal waveforms of the laser control circuit of the present invention shown in FIG. 7 after a CPU changes the rotating direction of the polygon motor.

FIGS. 9A to 9C are waveform charts illustrating the waveform of each signal in the laser control circuit 132 illustrated in FIG. 7 after the rotating direction of the polygon motor 148 is changed by the CPU.

After changing the rotating direction, the CPU makes the BD lighting signal to be again turned ON at all times in order to identify the detection signal (see FIG. 9A). In this case, an output level of the BD sensor signal at the scanning terminal end becomes unstable due to the dirt deposited onto a rear end of the reflection surface (leading end before the rotating direction is changed). Two cases are considered when the identification is done in this state.

Case 1: Both BD sensor signals at scanning terminal end and at scanning start end are detected This is a case in which the rising edge L2 of the second signal pulse is detected during time t1 from the time D1 that is a falling timing of the first signal pulse of the BD sensor signal, as shown in FIG. 9B.

This case is considered, since the output level of the BD sensor is unstable.

In this case, the BD lighting signal is temporarily turned OFF after the predetermined number of pixel clocks from the time L2, and then, the BD lighting signal is turned ON after the time T0 has elapsed from the time L2. Accordingly, the BD sensor signal at the scanning terminal end is masked. Thereafter, the BD lighting signal is temporarily turned OFF after the predetermined number of pixel clocks from the rising time L1 of the BD sensor signal, and then, the BD lighting signal is turned ON after the time T0 has elapsed from the time L1. This control is repeated, whereby only the detection signal at the scanning start end can be obtained.

Case 2: Only the BD sensor signal at scanning start end is detected

This is a case in which the rising edge L2 of the second signal pulse is not detected during the time t1 from the time D1 that is the falling timing of the first signal pulse of the BD sensor signal, as shown in FIG. 9C.

In this case, the BD lighting signal is temporarily turned OFF after the predetermined number of pixel clocks from the rising time L1 of the first signal pulse, and then, the BD lighting signal is turned ON after the time T0 has elapsed from the time L1. Accordingly, the BD sensor signal at the scanning terminal end is masked. Thereafter, the BD lighting signal is temporarily turned OFF after the predetermined number of pixel clocks from the rising time L1 of the next BD sensor signal, and then, the BD lighting signal is turned ON after the time T0 has elapsed from the time L1. This control is repeated, whereby only the detection signal at the scanning start end can be obtained.

<Modification Provided with Cumulative Rotating Time Storage Section and Reporting Section>

Figure 10:
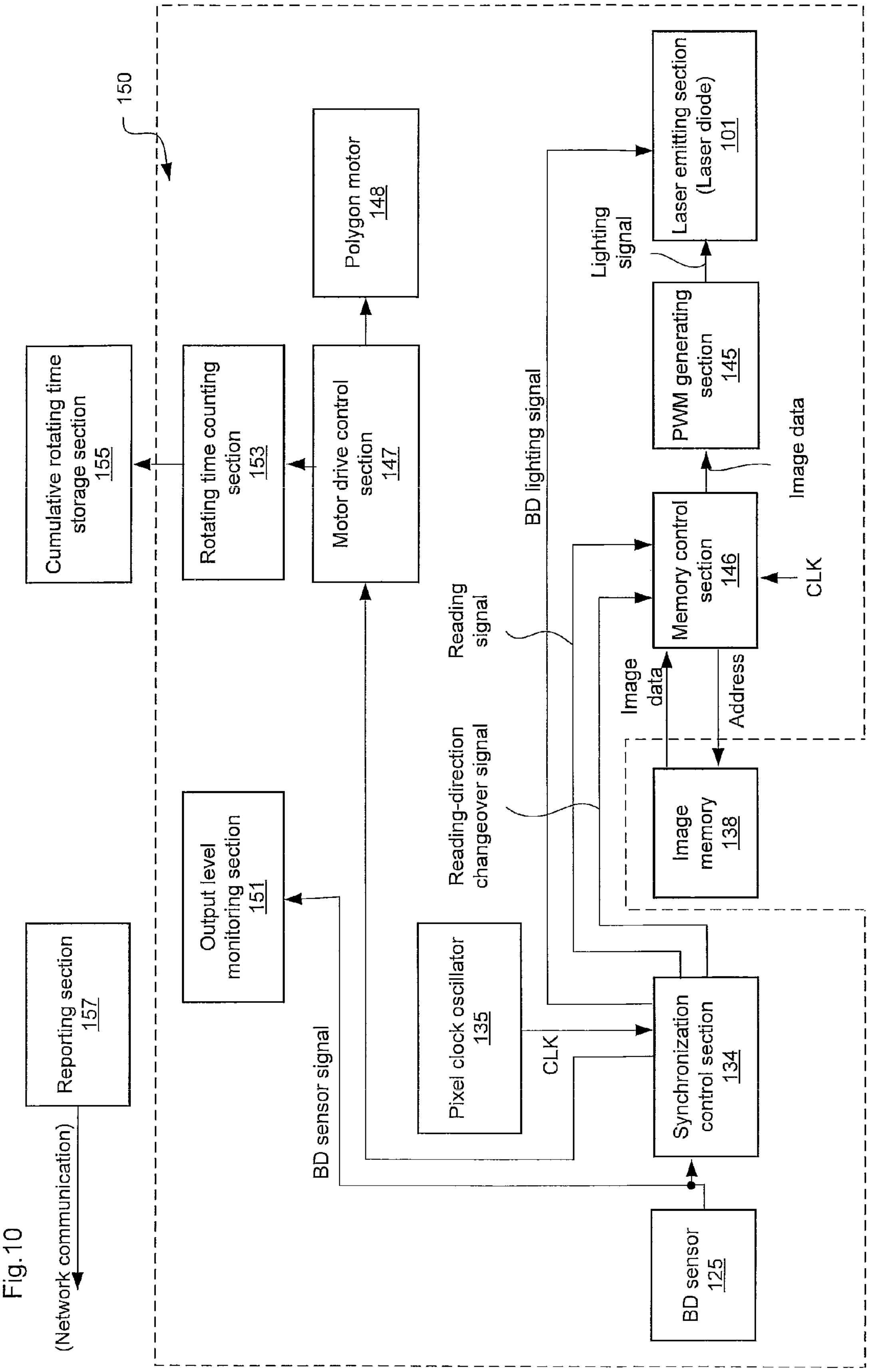
FIG. 10 is a block diagram illustrating a different configuration of the control section, particularly the laser control circuit, of the image forming apparatus according to the present invention.

A modification of the image forming apparatus according to the present invention will be described. FIG. 10 is a block diagram showing a configuration of the control section, particularly a different configuration of the laser control circuit, of the image forming apparatus according to the present invention. The control section in FIG. 10 is different from the laser control circuit shown in FIG. 7 in that the control section in FIG. 10 includes an output level monitoring section 151, a rotating time counting section 153, a cumulative rotating time storage section 155, and a reporting section 157. The reporting section 157 makes communication with an external information processing device through a network. The BD sensor signal is inputted to the output level monitoring section 151. The output level monitoring section 151 monitors the output level of the BD sensor signal. The rotating time counting section 153 counts the rotating time of the polygon motor 148. The cumulative rotating time storage section 155 stores a cumulative value of the counted rotating time. The cumulative rotating time storage section 155 is made of a non-volatile memory. The other sections in FIG. 10 are the same as the sections in FIG. 7. In the embodiment shown in FIG. 10, the output level monitoring section 151 and the rotating time counting section 153 are included in the laser control circuit 150. The laser control section 150 is indicated as enclosed by a dotted line. However, the laser control section is not limited to this configuration.

The output level monitoring section 151 monitors the output level of the BD sensor signal. When a condition in which the BD sensor signal is not detected in a predetermined interval corresponding to one main-scanning line occurs a predetermined number of times or more, the output level monitoring section 151 recognizes that the apparatus is in the state in which the detection signal at the scanning start end is not normally outputted. In response to this recognition, the CPU in the control section controls the polygon motor 148 to rotate in the reverse direction.

The output level monitoring section 151 may recognize that the output level of the BD sensor signal exceeds a predetermined rage. In response to this condition, the CPU determines that the apparatus is in the state in which the detection signal at the scanning start end is not normally outputted, and thereafter controls the polygon motor 148 to rotate in the reverse direction.

The rotating time counting section 153 counts the rotating time from when the polygon motor 148 is started to when it is stopped. The CPU in the control section allows the cumulative rotating time storage section 155 to store the rotating time of the polygon motor 148, counted by the rotating time counting section 153, as the cumulative value. Specifically, when the polygon motor 148 is stopped, a newly counted rotating time is added to the value (cumulative rotating time) stored in the cumulative rotating time storage section 155, and this result is stored in the cumulative rotating time storage section 155. In the present embodiment, the control section controls the polygon motor 148 to rotate in the reverse direction after the cumulative rotating time reaches a predetermined threshold value. The cumulative rotating time stored in the cumulative rotating time storage section 155 is reset when, for example, a service engineer carries out a predetermined operation after he/she cleans or exchanges the polygon mirror 111. After the reset, the cumulative rotating time is smaller than the threshold value, so that the control section allows the polygon motor 148 to rotate in a normal direction.

After rotating the polygon motor 148 in the reverse direction, the CPU reports this condition to a user. This condition may be reported by means of an unillustrated display section of the image forming apparatus. Alternatively, a report may be sent to an information processing device connected via the network in order to promote awareness of a user or a maintenance staff who uses this information processing device. The report through the network is given to the external information processing device (client PC, maintenance management server) by the reporting section 157.

The CPU controls such that the cumulative rotating time, from when the polygon motor 148 rotates in the normal direction to when a state in which the detection signal of the BD sensor is not normally outputted occurs, is held in the cumulative rotating time storage section 155 as a first cumulative rotating time. The CPU allows the cumulative rotating time storage section 155 to store, as a second cumulative rotating time different from the first cumulative rotating time, the cumulative rotating time after the polygon motor 148 rotates in the reverse direction. Then, the CPU controls to give a report for promoting a maintenance check when or before the second cumulative rotating time reaches the first cumulative rotating time. The report is given when, for example, the second cumulative rotating time reaches a predetermined ratio with respect to the held first cumulative rotating time. For example, the report is given when the second cumulative rotating time reaches 75% of the first cumulative rotating time.

<Modification of Correcting Emitted Quantity of Beam>

A modification will be described. In the modification, the laser control circuit 131 controls an illumination intensity of the emitted laser beam from the laser diode 101 in such a manner that the intensity of the laser beam at the scanning terminal end is stronger than the intensity of the laser beam at the scanning start end, when the reflection member rotates in the reverse direction.

Figure 11:
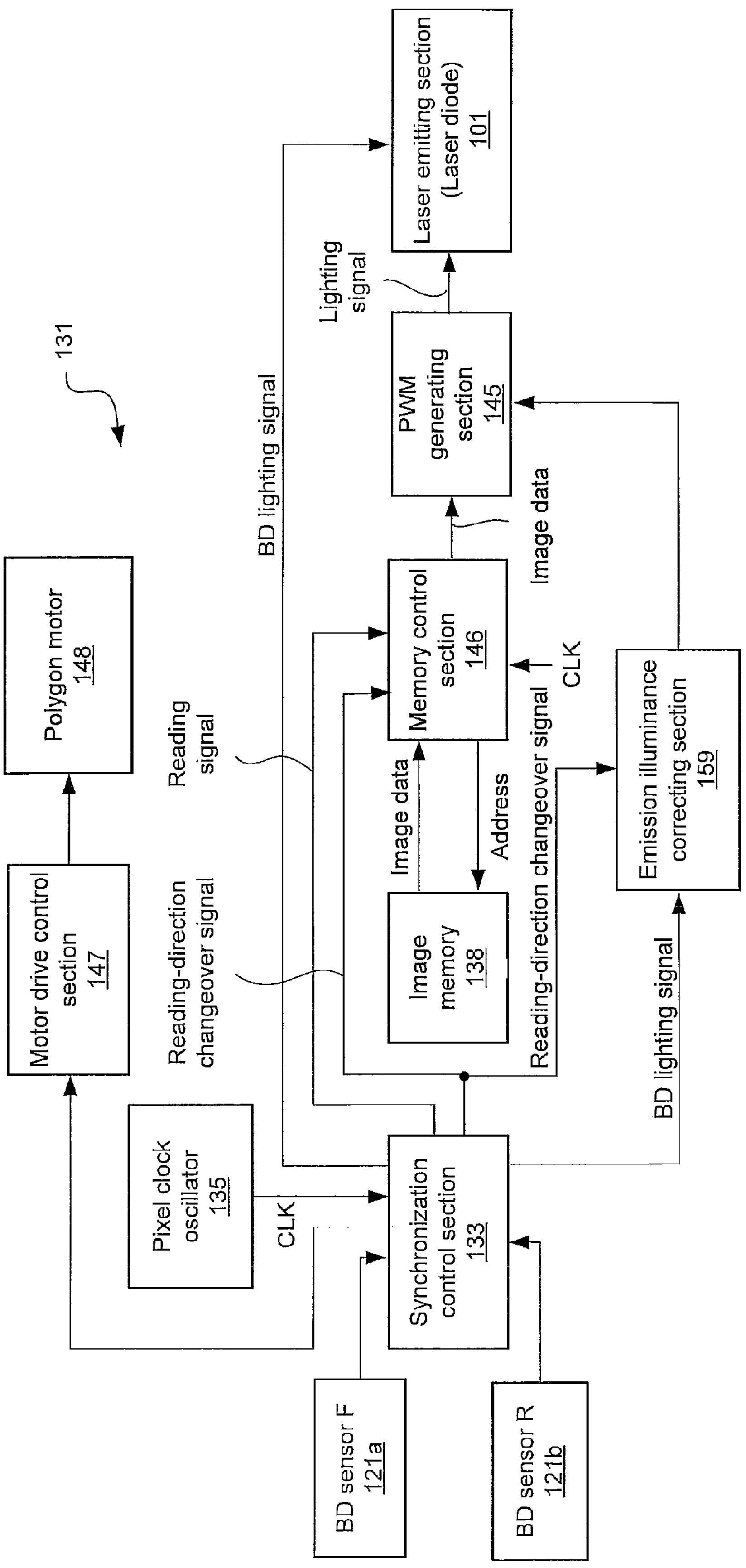
FIG. 11 is a block diagram illustrating a different configuration of the control section, particularly the laser control circuit, of the image forming apparatus according to the present invention.

FIG. 11 is a block diagram illustrating a configuration of the modification that is a portion of the laser control circuit in the control section of the image forming apparatus according to the present invention. Compared to FIG. 3, the block diagram in FIG. 11 is different in that it has an emission illuminance correcting section 159.

The emission illuminance correcting section 159 changes an emission illuminance of the laser diode 101 between a case in which the signal indicating the scanning start end is obtained from the synchronization control section 133 so as to scan the scanning start end for each scan and a case in which the scanning terminal end is scanned. More specifically, after the polygon motor 148 is rotated in the reverse direction, the emission illuminance correcting section 159 increases the intensity of the laser beam at the scanning start end more than the intensity of the laser beam at the scanning terminal end so as to offset the dirt at the scanning terminal end of the polygon mirror 111 (the scanning start end when the polygon motor 148 rotates in the normal direction). When the polygon motor is rotated in the normal direction, the emission illuminance at the scanning start end and the emission illuminance at the scanning terminal end are controlled to be equal to each other.

The output signal from the emission illuminance correcting section 159 is inputted to the PWM generating section 145. The emission illuminance is changed by changing the PWM of the lighting signal. The change of the emission illuminance from the scanning start end to the scanning terminal end is held at the emission illuminance correcting section 159 in advance as a PWM correction pattern. The emission illuminance correcting section 159 outputs the held PWM correction pattern to the PWM generating section 145 in synchronism with the BD lighting signal.

<In Case of Exposure Unit Employing Multi-Beam and One Polygon>

There has recently been known, as a device for a full-color image forming apparatus, an exposure unit having a multi-beam-one-polygon configuration including one polygon mirror, wherein laser beams each corresponding to each color component are reflected on the polygon mirror so as to obtain respective scanning beams. The present invention is applicable to an exposure unit having a multibeam-one-polygon configuration. In this case, reading directions of image data pieces for all colors are reversed when the polygon motor is rotated in the reverse direction.

The exposure unit will be described in more detail below.

Figure 12:
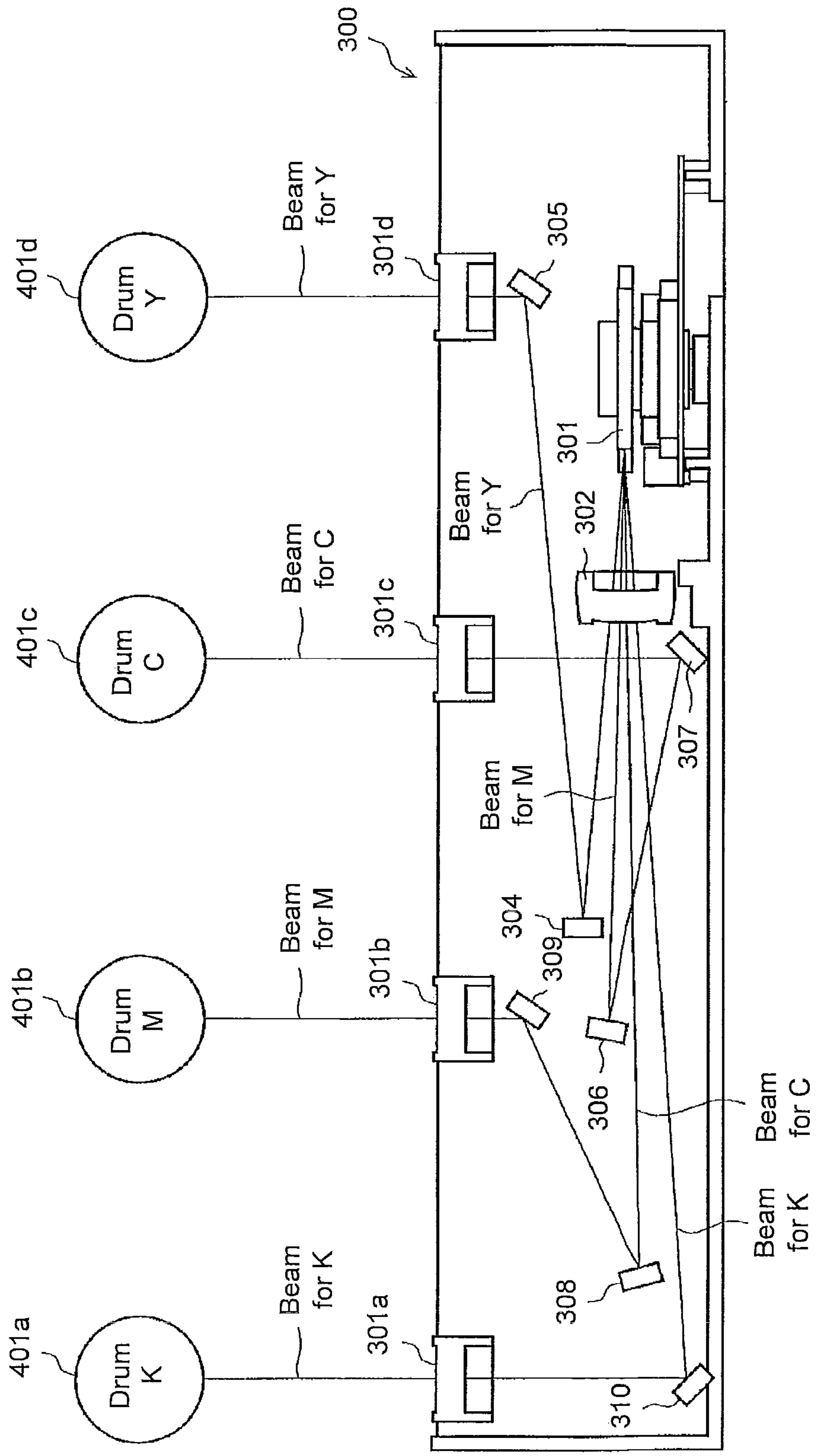
FIG. 12 is an explanatory view illustrating an example of a configuration of an exposure unit of a multibeam-one-polygon structure according to the present invention.

FIG. 12 is an explanatory view illustrating an example of a configuration of the exposure unit having multibeam-one-polygon configuration. In the exposure unit, laser beams, each corresponding to each of four color components that are yellow (Y), magenta (M), cyan (C), and black (K), are reflected on one polygon mirror so as to scan photoconductor drums 401_a_ to 401_d_, each corresponding to each color component. In FIG. 12, the exposure unit 300 includes a polygon mirror 301, an fθ lens 302, a K cylindrical lens 303_a_, a C cylindrical lens 303_b_, an M cylindrical lens 303_c_, a Y cylindrical lens 303_d_, a Y first mirror 304, a Y second mirror 305, an M first mirror 306, an M second mirror 307, a C first mirror 308, a C second mirror 309, a K first mirror 310, and a casing 313. The exposure unit 300 has four laser emitting sections (not shown). Each of the laser emitting sections emits a Y-beam, an M-beam, a C-beam, and a K-beam corresponding to each color component. Each of the laser beams scans the corresponding photoconductor drum.

Figure 13:
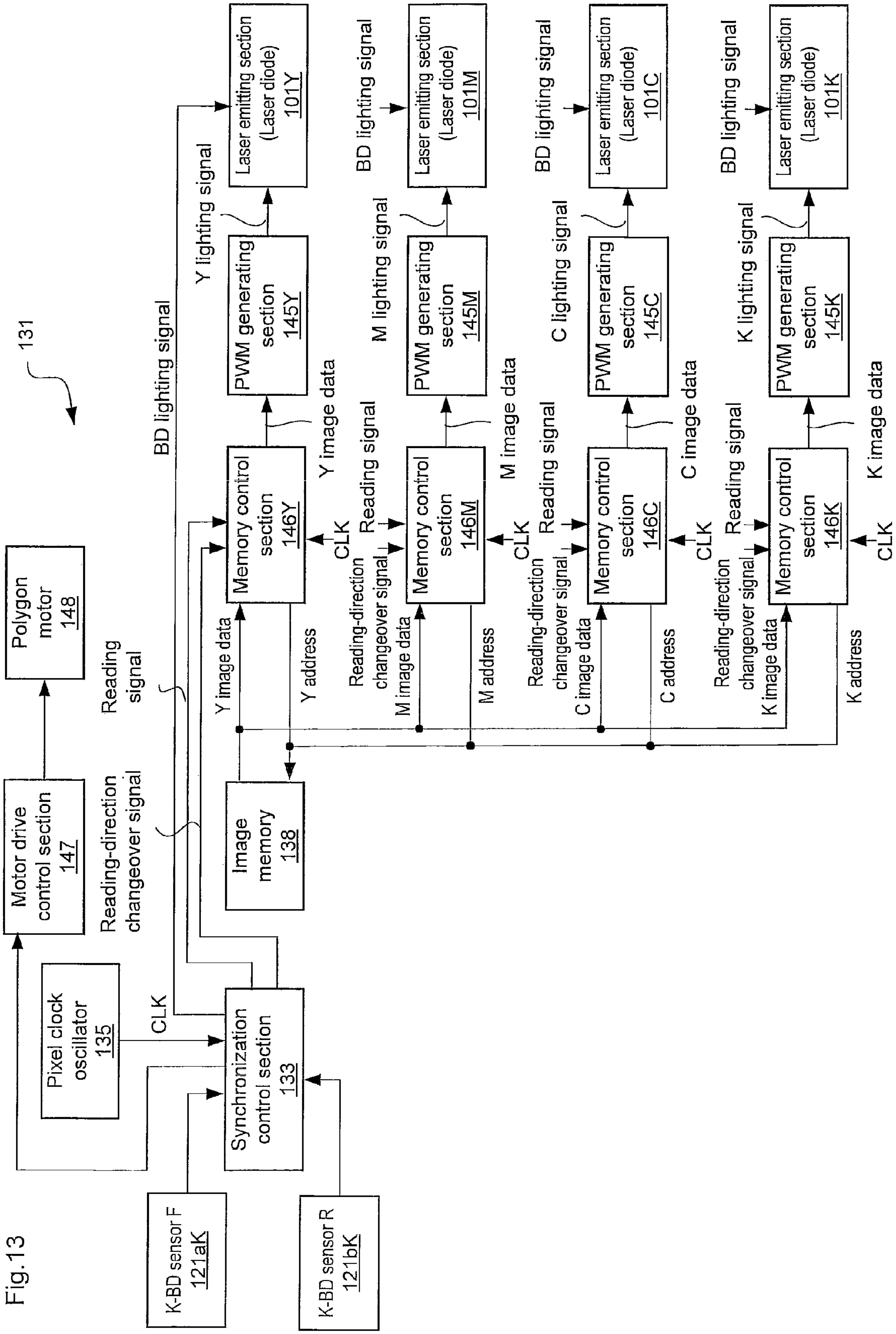
FIG. 13 is a block diagram illustrating a configuration of the control section, particularly the laser control circuit, for controlling the exposure unit shown in FIG. 12 according to the present invention.
Figure 14A:
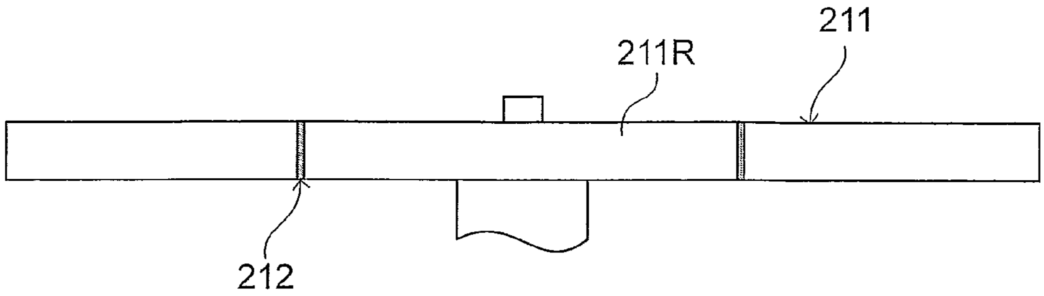
FIG.14A PRIOR ART
FIGS. 14A to 14C are explanatory views illustrating a degree of dirt on a reflection surface in a conventional image forming apparatus.
Figure 14B:
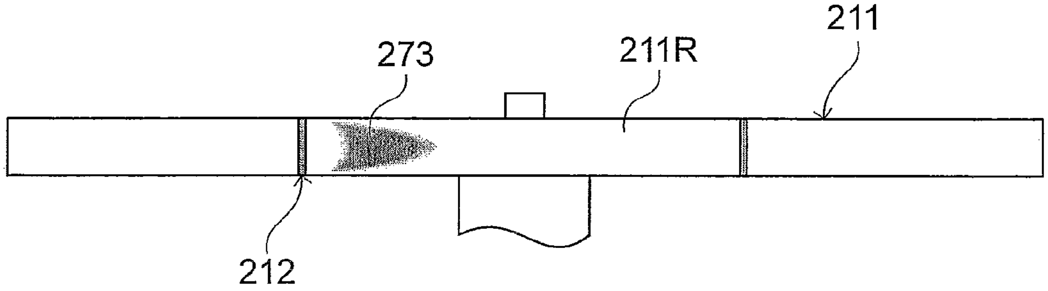
FIG.14B PRIOR ART
Figure 14C:
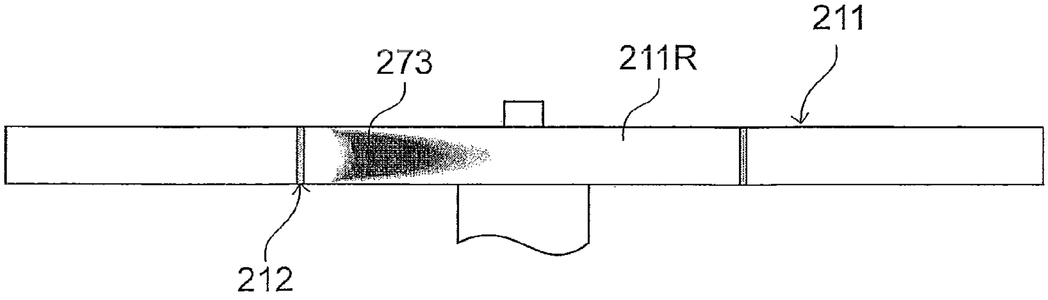
FIG.14C PRIOR ART
Figure 15A:
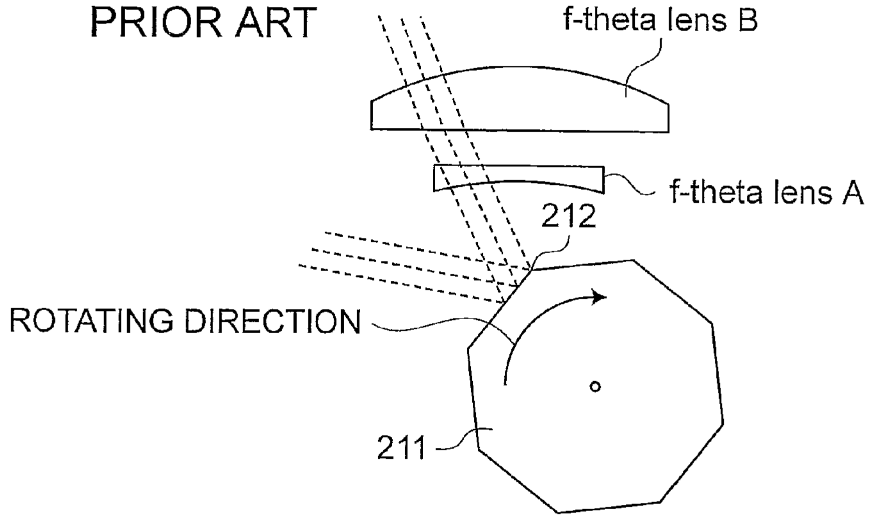
FIG.15A PRIOR ART
FIGS. 15A to 15C are explanatory view illustrating a state in which laser beam is deflected with a rotation of one reflection surface 112 of the polygon mirror to become a scanning beam in the conventional image forming apparatus.
Figure 15B:
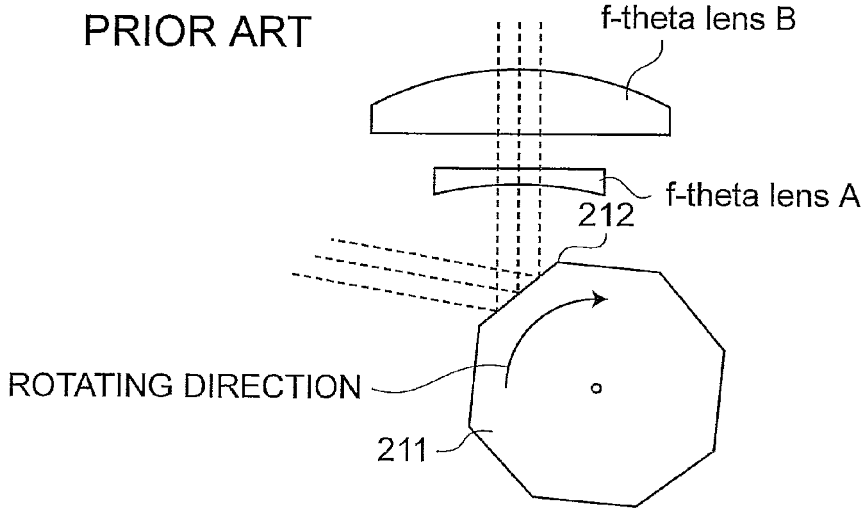
FIG.15B PRIOR ART
Figure 15C:
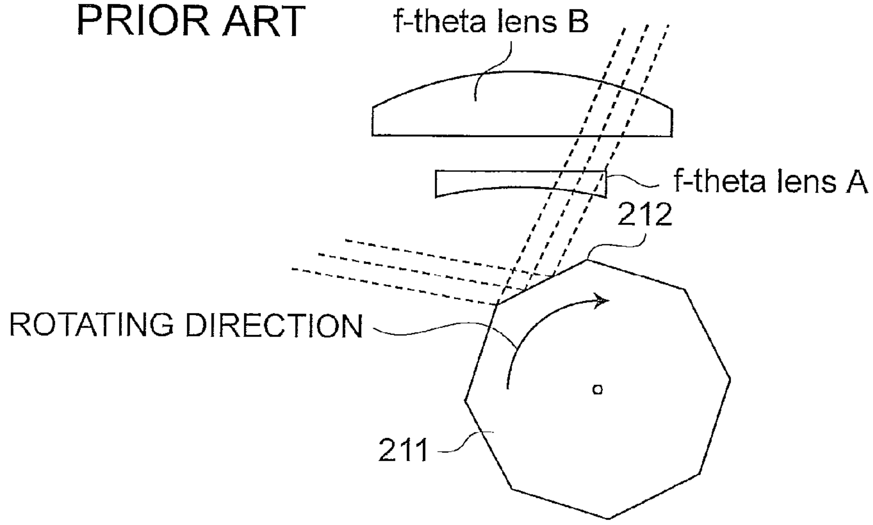
FIG.15C PRIOR ART

FIG. 13 is a block diagram illustrating a configuration of the control section, particularly the laser control circuit, which controls the exposure unit 300 shown in FIG. 12. Symbols of sections in FIG. 12 correspond to those in FIG. 3. The sections corresponding to each color component is given symbols Y, M, C, and K indicating the respective color components. As illustrated in FIG. 13, the synchronization control section 133, the pixel clock oscillator 135, the image memory 138, the motor drive control section 147, and the polygon motor 148 are shared by YMCK. On the other hand, the memory control section 146, PWM generating section 145, and laser emitting section 101 in FIG. 3 are provided so as to correspond to each color component in FIG. 13. The BD sensor detects only the K-beam. Timings of the other color components YMC are determined based on detection timings of K-BD sensor F 121_a_ and K-BD sensor R 121_b_.

The laser beams emitted from laser diodes 101Y, 101M, 101C, and 101K in FIG. 13 are incident on the polygon mirror 301 with a different angle in a vertical direction. The laser beams reflected on the polygon mirror 301 advance through the fθ lens 302 with the angular difference maintained as shown in FIG. 12. The fθ lens 302 refracts the laser beams, which are reflected onto the side face of the polygon mirror 301 that rotates with a constant speed so as to become scanning beams, so as to move on peripheral surfaces of photoconductor drums 101_a_ to 101_d_ with constant linear velocity.

The Y-beam passing through the fθ lens 302 is reflected on the Y first mirror 304 and the Y second mirror 305, passes through the Y cylindrical lens 303_d_, and then, scans the peripheral surface of the Y photoconductor drum 101_d_. Thus, an electrostatic latent image corresponding to a print pattern of Y component is formed on the peripheral surface of the photoconductor drum 101_d_.

The M-beam passing through the fθ lens 302 is reflected on the M first mirror 306 and the M second mirror 307, passes through the M cylindrical lens 303_c_, and then, scans the peripheral surface of the M photoconductor drum 101_c_. Thus, an electrostatic latent image corresponding to a print pattern of M component is formed on the peripheral surface of the photoconductor drum 101_c_.

The C-beam passing through the fθ lens 302 is reflected on the C first mirror 308 and the C second mirror 309, passes through the C cylindrical lens 303_b_, and then, scans the peripheral surface of the C photoconductor drum 101_b_. Thus, an electrostatic latent image corresponding to a print pattern of C component is formed on the peripheral surface of the photoconductor drum 101_b_.

The K-beam passing through the fθ lens 302 is reflected on the K first mirror 310, passes through the K cylindrical lens 303_a_, and then, scans the peripheral surface of the K photoconductor drum 101_a_. Thus, an electrostatic latent image corresponding to a print pattern of K component is formed on the peripheral surface of the photoconductor drum 101_a_.

In the present embodiment, memory control sections 146Y, 146M, 146C, and 146K change the reading order of the image data from the image memory 138 between the normal order and the reverse order according to the reading-direction changeover signal. Specifically, when the reading order is the normal order, the addresses of the image data pieces, which should be read, are changed to the normal order, while when the reading order is the reverse order, the addresses of the image data pieces, which should be read, are changed to the reverse order, and then, successively receive the image data stored in each address from the image memory 138. The memory control sections 146Y, 146M, 146C, and 146K change the reading order by a common reading-direction changeover signal. Therefore, when the polygon motor 148 is rotated in the reverse direction, the reading directions of the image data pieces of all colors are reversed.

The control section changes the reading-direction changeover signal, when it determines that the BD signal from the K-BD sensor F 121_a_ is not normally outputted. According to this situation, the memory control sections 146Y, 146M, 146C, and 146K change the reading order of the image data pieces from the normal order to the reverse order.

<Schematic Configuration of Image Forming Apparatus>

A schematic configuration of an overall image forming apparatus including the laser scanning optical system and the control section will be described.

FIG. 1 is an explanatory view illustrating the schematic configuration of the image forming apparatus according to the present invention.

In FIG. 1, an image forming apparatus 11 forms a monochromatic image onto a predetermined sheet (recording sheet) in accordance with externally received image data. As illustrated in FIG. 1, the image forming apparatus 11 includes an exposure unit 13, a developing device 15, a photoconductor 17, a charging device 19, a cleaner unit 21, a fuser unit 23, a sheet feeding tray 25, a sheet feeding path 27 extending upwardly from the sheet feeding tray 25, a sheet transporting path 31 from a terminal end of the sheet feeding path 27 to a sheet exit tray 33 through a registration roller 29, a transfer belt 45, and the fuser unit 23, the sheet exit tray 33, and the like.

The charging device 19 is charging means for uniformly charging the surface of the photoconductor drum 17 with a predetermined potential.

The detailed structure of the exposure unit 13 is as described with reference to FIG. 2.

The photoconductor 17, which is uniformly charged with the charging device 19, is exposed in accordance with the inputted image data, whereby an electrostatic latent image in accordance with the image data is formed on the surface of the photoconductor 17. The developing device 15 makes the electrostatic latent image, formed on the photoconductor 17, visible with toner. The cleaner unit 21 removes and collects the toner remaining on the surface of the photoconductor 17 after the development and image transfer.

The toner on the photoconductor 17, which is made visible as described above, is transferred onto a sheet conveyed on the sheet transporting path 31. A transfer mechanism 39 for the transfer (in the present embodiment, the unit of transfer belt 45) is for transferring the toner on the sheet through an application of an electric field of a polarity reverse to a charge of the toner. For example, when the electrostatic latent image has charges of negative polarity, a positive polarity is applied to the transfer mechanism 39.

The transfer mechanism 39 in the present embodiment has the transfer belt 45 that is looped around a drive roller 41, a driven roller 43, and other rollers and has a predetermined resistance value (in a range of $1\times10^9$ to $1\times10^{13}$ Ω·cm). An elastic conductive roller 49, which is different from the drive roller 41 or the driven roller 43, and which can apply a transfer electric field, is arranged at a contact portion 47 between the photoconductor 17 and the transfer belt 45. The elastic conductive roller 49 has elasticity. Therefore, the photoconductor 17 and the transfer belt 45 are brought, not into linear contact, but into face contact with each other with a predetermined width (referred to as a transfer nip). Accordingly, transfer efficiency to the transported sheet is enhanced.

A discharge roller 51 for discharging the charged sheet by a voltage applied when passing the contact portion 47 in order to achieve a smooth transport of the sheet to a next process is arranged at a downstream side of a transfer region of the transfer belt 45. The discharge roller 51 is arranged at a backside of the transfer belt 45.

The transfer mechanism 39 further includes a cleaning unit 53, and a discharging mechanism 55, in order to clean the toner on the transfer belt 45 and discharge the transfer belt 45. The discharging mechanism 55 may employ a technique of discharging the transfer belt 45 through the grounding via a device, or a technique of positively applying a polarity reverse to the polarity of the transfer electric field. The toner transferred onto the sheet by the transfer mechanism 39 is transported to the fuser unit 23.

The fuser unit 23 includes a heat roller 57 and a pressure roller 59. The heat roller 57 has, arranged at an outer peripheral portion thereof, a sheet separation claw 61, a roller surface temperature detecting member 63 (thermistor), and a roller surface cleaning member 65. A heat source (heater) 67 for heating the surface of the roller to a predetermined temperature (temperature set for fusing: approximately 160 to 200° C.) is arranged at an inner peripheral portion of the heat roller 57.

On the other hand, a pressure member, which allows the pressure roller 59 to be in press contact with the heat roller 57 with a predetermined pressure amount, is arranged at both ends of the pressure roller 59. The sheet separation claw 61 and the roller surface cleaning member 65 are arranged at an outer periphery of the pressure roller 59 like the outer periphery of the heat roller 57.

The fuser unit 23 applies heat to a non-fused toner on the transported sheet with a temperature at the surface of the heat roller 57 so as to fuse the non-fused toner at a press-contact portion (nip portion) between the heat roller 57 and the pressure roller 59. The fuser unit 23 further fixes the non-fused toner onto the sheet by a press-contact force by the pressure roller 59 with a riveting action.

The sheet feeding tray 25 is for accumulating sheets (recording sheets) used for image formation. In the present embodiment, the sheet feeding tray 25 is provided at a bottom of the image forming portion and at a side wall face. In order to perform a high-speed printing process, the present apparatus has a plurality of sheet feeding trays, each being capable of storing 500 to 1500 sheets of standard size, arranged at the bottom of the image forming portion. On the other hand, a large-capacity sheet feeding cassette 73 that can store a great number of sheets of different types, and a manual sheet feeding tray 75 mainly used for printing a sheet of a non-standard size are mounted to the side face of the apparatus.

The sheet exit tray 33 is mounted at a side face opposite to the manual sheet feeding tray 75 of the apparatus. Instead of the sheet exit tray 33, a finisher (staple, punch process, or the like) of an exit sheet or a multi-bin sheet exit tray may be arranged as an option.

Furthermore, the image forming apparatus 11 has a control section (not shown). The control section controls an operation of the image forming apparatus 11. For example, the control section includes a microcomputer, a ROM that stores a control program, which is a procedure of a process executed by the microcomputer, a RAM that provides a work area for the operation, a non-volatile memory that backs up and retains data needed for the control, an input circuit to which an input signal from a sensor or a switch is connected and that includes an input buffer or an A/D conversion circuit, an output circuit that includes a driver for driving a load such as a motor, a solenoid, a lamp, or the like.

Next, a sheet transporting process corresponding to the process mode of the image forming apparatus 11 will be described below in detail. The sheet adapted to a print command is selected from the plurality of sheet feeding trays 25 by the microcomputer of the control section. The sheet is transported to the registration roller 29 by the transport rollers in the sheet transporting path. The sheet reaches the registration roller 29 and temporarily stops according to the control by the microcomputer. The microcomputer rotates the registration roller 29 again at the timing when a leading end of the sheet and the image information on the photoconductor 17 are matched. With this operation, the sheet is transported to the transfer mechanism 39. At the transfer mechanism 39, toner corresponding to the image information on the sheet is transferred, and then, the sheet is guided to the fuser unit 23 where the transferred toner is fixed onto the sheet. Thereafter, the sheet is discharged to the sheet exit tray 33.

The microcomputer controls a transporting method from the fuser unit 23 to the sheet exit tray 33 according to a print mode (copier mode, printer mode, or FAX mode) and a print processing method (single-side printing, duplex printing, or the like). In the copier mode, it is frequently controlled such that a sheet is transported and discharged with a printed surface facing upward, since a user operates the apparatus near the apparatus. This is referred to as "face-up discharge". On the other hand, in the printer mode or the FAX mode, a technique of "face-down discharge" in which pages of the discharged sheets are arranged is frequently used, since a user is not near the apparatus.

Various modifications are possible for the present invention other than the aforementioned embodiment. It should not be construed that the modifications do not belong to the scope of the present invention. The present invention should include the meaning equivalent to the claims and all modifications within the scope of the present invention.

What is claimed is:

1. An image forming apparatus comprising:

a polygon motor that rotates a reflection member in the shape of an equilateral polygonal column about an axis of the reflection member;

a laser emitting section that emits a laser beam toward a side face of the rotating reflection member;

a photoconductor that is scanned by a laser beam reflected from the side face of the reflection member;

a beam detecting section that detects the reflected laser beam at a scanning start position and a scanning final position respectively, the scanning start position being the position just before where the scanning of the photoconductor starts, and the scanning final position being the position just after where the scanning of the photoconductor ends; and a control section that controls the polygon motor and the laser emitting section, based on detection signals from the beam detecting section, wherein when the detection signal at the scanning start position does not meet a predetermined time-based standard and/or a predetermined output-level standard, the control section determines that the apparatus is in a state in which the detection signal is not normally outputted or in a state in which the detection signal is predicted not to be normally outputted, and the control section then controls the polygon motor so that the reflection member rotates in a reverse direction.

2. The image forming apparatus according to claim 1, wherein the control section controls the laser emitting section at a time when the detection signal at the scanning start position is determined as a standard, so that a scanning pattern on the photoconductor is controlled.

3. The image forming apparatus according to claim 1, wherein the control section predicts when a next detection signal at the scanning start position will be outputted, based on the previous detection signals at the scanning start position, and when mis-detections occur a predetermined number of times, in which the detection signal is not detected although the detection signal is predicted to be outputted, the control section further determines that the apparatus is in the state in which the detection signal is not normally outputted.

4. The image forming apparatus according to claim 1, wherein when an output level of the detection signal at the scanning start position is outside a predetermined range, the control section further determines that the apparatus is in the state in which the detection signal is not normally outputted or in the state in which the detection signal is predicted not to be normally outputted.

5. The image forming apparatus according to claim 1, further comprising:

a rotation time measurement section that measures rotation time of the polygon motor; and a cumulative rotation time storage section that stores a cumulative value of the measured rotation time, wherein the control section enables the rotation time measurement section to measure the rotation time from when the polygon motor starts rotating to when the polygon motor stops, and enables the cumulative rotation time storage section to store the cumulative value of the measured rotation time, and when the cumulative value reaches to a predetermined value, the control section further determines that the apparatus is in the state in which the detection signal at the scanning start position is not normally outputted or in the state in which the detection signal is predicted not to be normally outputted.

6. The image forming apparatus according to claim 1, wherein the beam detecting section comprises:

a single optical sensor; and optical members that are positioned at the scanning start position and the scanning final position respectively, and guide the reflected laser beam to the optical sensor when the reflected laser beam scans each position.

7. The image forming apparatus according to claim 6, wherein the control section measures time intervals between successive detection signals outputted from the optical sensor while the laser beam is continuously emitted from the laser emitting section; identifies the detection signal at the scanning start position or the detection signal at the scanning final position, based on time lengths of the intervals; and predicts when a next detection signal at the scanning start position will be outputted, based on a result of identifying the previous detection signals.

8. The image forming apparatus according to claim 1, wherein the beam detecting section comprises optical sensors that are positioned at the scanning start position and the scanning final position respectively.

9. The image forming apparatus according to claim 5, further comprising:

a reporting section that reports to a user about information indicating that the reflection member has been rotated in the reverse direction.

10. The image forming apparatus according to claim 9, wherein the cumulative rotation time storage section further stores a time period from when the control section controls the rotation of the reflection member in a predetermined direction to when the control section controls the rotation of the reflection member in the reverse direction, and the reporting section further reports to a user about information promoting a maintenance check and/or component replacement while the reflection member rotates in the reverse direction but before a time period of the reverse rotation reaches to the time period of the rotation in the predetermined direction.

11. The image forming apparatus according to claim 1, wherein the control section controls emission illuminance of the laser beam from the laser emitting section when the control section controls the reverse rotation of the reflection member, so that intensity of the reflected laser beam at the scanning final position will be higher than intensity of the reflected laser beam at the scanning start position.

12. The image forming apparatus according to claim 1, further comprising:

a storage section that stores image data indicating a set of pixels, wherein each of the pixels comprises one or more color components;

the photoconductor may be one or more in accordance with the number of the color components;

the laser emitting section may be one or more in accordance with the number of the photoconductors;

the control section reads from the storage section the pixels comprising the color components, and controls, according to the read pixels, emission illuminance of a laser beam emitted from each of the laser emitting sections;

each of the laser emitting sections emits the laser beam toward the reflection member;

each of the photoconductors is scanned by a reflected laser beam emitted originally from the corresponding laser emitting section;

the beam detecting section detects any one of the reflected laser beams at the scanning start position and the scanning final position each; and the control section controls a changeover of an order, in which the pixels comprising the color components are read, from a normal order to a reverse order in accordance with the reverse rotation of the reflection member.

* * * * *